United States Patent
Taylor et al.

(10) Patent No.: US 12,502,819 B2
(45) Date of Patent: Dec. 23, 2025

(54) FLUOROPOLYMER FREE POLYMER PROCESSING AIDS

(71) Applicant: NOVA Chemicals (International) S.A., Fribourg (CH)

(72) Inventors: Jared Taylor, Calgary (CA); Tony Tikuisis, Calgary (CA); P. Scott Chisholm, Calgary (CA); Norman Aubee, Okotoks (CA); Douglas Checknita, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 211 days.

(21) Appl. No.: 18/576,184

(22) PCT Filed: Jun. 9, 2022

(86) PCT No.: PCT/IB2022/055379
§ 371 (c)(1),
(2) Date: Jan. 3, 2024

(87) PCT Pub. No.: WO2023/285888
PCT Pub. Date: Jan. 19, 2023

(65) Prior Publication Data
US 2024/0327631 A1   Oct. 3, 2024

Related U.S. Application Data

(60) Provisional application No. 63/221,729, filed on Jul. 14, 2021.

(51) Int. Cl.
*B29C 48/00* (2019.01)
*B29K 23/00* (2006.01)
(Continued)

(52) U.S. Cl.
CPC .............. *B29C 48/022* (2019.02); *C08K 3/22* (2013.01); *C08K 3/26* (2013.01); *C08L 23/06* (2013.01);
(Continued)

(58) Field of Classification Search
CPC ..... B29C 48/022; B29C 48/0018; C08K 3/22; C08K 3/26; C08K 2003/2296;
(Continued)

(56) References Cited

U.S. PATENT DOCUMENTS

| 2,968,649 | A | 1/1961 | Pailthorp et al. |
| 3,051,677 | A | 8/1962 | Rexford et al. |

(Continued)

FOREIGN PATENT DOCUMENTS

| CA | 2264463 A1 | 9/2000 |
| EP | 0 217 585 A2 | 4/1987 |

(Continued)

OTHER PUBLICATIONS

ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).

(Continued)

*Primary Examiner* — Michael M. Robinson
(74) *Attorney, Agent, or Firm* — Thomas J. Styslinger

(57) ABSTRACT

A polymer processing aid (PPA) reduces melt defects in extruded polyolefins in the absence of fluoropolymers. The polymer processing aid comprises a polyalkylene glycol such as a polyethylene glycol together with a high pressure low density polyethylene (LDPE) and reduces melt defects well in a thermoplastic polyolefin such as a linear low density polyethylene (LLDPE).

38 Claims, 1 Drawing Sheet

(51) Int. Cl.
| | |
|---|---|
| B29K 71/00 | (2006.01) |
| B29K 105/00 | (2006.01) |
| B29K 105/16 | (2006.01) |
| B29K 303/08 | (2006.01) |
| B29K 509/02 | (2006.01) |
| C08K 3/22 | (2006.01) |
| C08K 3/26 | (2006.01) |
| C08L 23/06 | (2006.01) |
| C08L 23/0807 | (2025.01) |
| C08L 71/02 | (2006.01) |

(52) U.S. Cl.
CPC ........... *C08L 23/0815* (2013.01); *C08L 71/02* (2013.01); *B29C 48/0018* (2019.02); *B29K 2023/06* (2013.01); *B29K 2023/0625* (2013.01); *B29K 2023/0633* (2013.01); *B29K 2023/08* (2013.01); *B29K 2071/02* (2013.01); *B29K 2105/0094* (2013.01); *B29K 2105/16* (2013.01); *B29K 2303/08* (2013.01); *B29K 2509/02* (2013.01); *B29K 2995/0063* (2013.01); *B29K 2995/0078* (2013.01); *B29K 2995/0088* (2013.01); *B29K 2995/0097* (2013.01); *C08K 2003/2296* (2013.01); *C08K 2003/267* (2013.01); *C08L 2203/30* (2013.01); *C08L 2205/025* (2013.01); *C08L 2205/03* (2013.01); *C08L 2207/066* (2013.01)

(58) Field of Classification Search
CPC ............... C08K 2003/267; C08L 23/06; C08L 23/0815; C08L 71/02; C08L 2203/30; C08L 2205/025; C08L 2205/03; C08L 2207/066; C08L 2205/035; B29K 2023/06; B29K 2023/0625; B29K 2023/0633; B29K 2023/08; B29K 2071/02; B29K 2105/0094; B29K 2105/16; B29K 2303/08; B29K 2509/02; B29K 2995/0063; B29K 2995/0078; B29K 2995/0088; B29K 2995/0097
See application file for complete search history.

(56) References Cited

U.S. PATENT DOCUMENTS

| | | |
|---|---|---|
| 3,125,547 A | 3/1964 | Blatz |
| 3,222,314 A | 12/1965 | Wolinski |
| 3,318,854 A | 5/1967 | Honn et al. |
| 3,645,992 A | 2/1972 | Elston |
| 4,013,622 A | 3/1977 | Dejuneas et al. |
| 4,076,698 A | 2/1978 | Anderson et al. |
| 4,159,975 A | 7/1979 | Praetorius |
| 4,481,324 A | 11/1984 | Hall et al. |
| 4,540,538 A | 9/1985 | Corwin et al. |
| 4,855,360 A | 8/1989 | Duchesne et al. |
| 5,015,693 A * | 5/1991 | Duchesne ............... C08L 23/02 524/277 |
| 5,272,236 A | 12/1993 | Lai et al. |
| 5,278,272 A | 1/1994 | Lai et al. |
| 5,342,868 A | 8/1994 | Kimura et al. |
| 5,459,187 A | 10/1995 | Taylor et al. |
| 5,534,572 A | 7/1996 | Taylor et al. |
| 5,550,193 A | 8/1996 | Chiu et al. |
| 5,582,923 A | 12/1996 | Kale et al. |
| 5,587,429 A | 12/1996 | Priester |
| 5,589,555 A | 12/1996 | Zboril et al. |
| 5,710,217 A | 1/1998 | Blong et al. |
| 5,733,155 A | 3/1998 | Sagawa |
| 5,830,947 A | 11/1998 | Blong et al. |
| 5,981,636 A | 11/1999 | Amos et al. |
| 6,147,146 A | 11/2000 | Horio et al. |
| 6,277,919 B1 | 8/2001 | Dillon et al. |
| 6,294,604 B1 | 9/2001 | Focquet et al. |
| 6,465,551 B1 | 10/2002 | Zhao et al. |
| 6,599,971 B2 | 7/2003 | Dotson et al. |
| 6,734,252 B1 | 5/2004 | Woods |
| 7,238,748 B2 | 7/2007 | Oriani |
| 7,375,157 B2 | 5/2008 | Amos et al. |
| 8,003,720 B2 | 8/2011 | Keegan et al. |
| 8,178,479 B2 | 5/2012 | Cernohous |
| 8,445,567 B2 * | 5/2013 | Stevenson ............... C08K 5/524 524/140 |
| 8,563,637 B2 | 10/2013 | Jakupca et al. |
| 8,648,134 B2 | 2/2014 | Cernohous et al. |
| 10,982,079 B2 * | 4/2021 | Lavallée ................ C08K 5/098 |
| 2002/0063359 A1 | 5/2002 | Williams et al. |
| 2005/0070644 A1 * | 3/2005 | Tikuisis ............... C08L 23/0815 524/386 |
| 2010/0311906 A1 | 12/2010 | Lavallee et al. |
| 2015/0240043 A1 | 8/2015 | Yoshida et al. |
| 2016/0229994 A1 | 8/2016 | Lavallée et al. |
| 2017/0342245 A1 | 11/2017 | Lavallée et al. |
| 2020/0308379 A1 * | 10/2020 | Rousseaux ............... H01B 1/24 |
| 2023/0024578 A1 | 1/2023 | Ruocco et al. |
| 2023/0036922 A1 | 2/2023 | Leaf et al. |

FOREIGN PATENT DOCUMENTS

| | | |
|---|---|---|
| EP | 2 524 941 A1 | 11/2012 |
| WO | WO-2011/050042 A1 | 4/2011 |
| WO | WO-2015/042561 A1 | 3/2015 |
| WO | WO-2015/042562 A1 | 3/2015 |
| WO | WO-2015/042563 A1 | 3/2015 |
| WO | WO-2016/100691 A1 | 6/2016 |
| WO | WO-2023/056207 A1 | 4/2023 |
| WO | WO-2023/056208 A1 | 4/2023 |
| WO | WO-2023/056210 A2 | 4/2023 |
| WO | WO-2023/056212 A1 | 4/2023 |
| WO | WO-2023/056213 A1 | 4/2023 |
| WO | WO-2023/056214 A1 | 4/2023 |
| WO | WO-2023/056250 A1 | 4/2023 |
| WO | WO-2023/149984 A1 | 8/2023 |
| WO | WO-2023/149985 A1 | 8/2023 |
| WO | WO-2023/154744 A1 | 8/2023 |

OTHER PUBLICATIONS

ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99 (pp. 1-6).

ASTM D6474-99 (Reapproved 2006)—Standard Test Method for Determining Molecular Weight Distribution and Molecular Weight Averages of Polyolefins by High Temperature Gel Permeation Chromatography. Copyright ASTM International. Current edition approved Mar. 15, 2006. Published Apr. 2006. Originally approved in 1999. Last previous edition approved in 1999 as D6474-99 (pp. 1-6).

ASTM D792-13—Standard Test Method for Density and Specific Gravity (Relative Density) of Plastics by Displacement—Current edition approved Nov. 1, 2013. Published Nov. 2013. Originally approved in 1944. Last previous edition approved in 2008 as D792-08 (pp. 1-6).

International Search Report and Written Opinion in PCT/IB2022/055379 dated Aug. 23, 2022.

Norma Maraschin, Polyethylene, Low Density, Kirk-Othmer Encyclopedia of Chemical Technology, vol. OO, (pp. 1-40), First Published Mar. 18, 2005.

O. Delgadillo-Velazquez and S.G. Hatzikiriakos, Processability of LLDPE/LDPE Blends: Capillary Extrusion Studies, Poly. Eng. Science, Sep. 2007, (pp. 1317-1326), published online in Wiley InterScience (www.interscience.wiley.com).

* cited by examiner

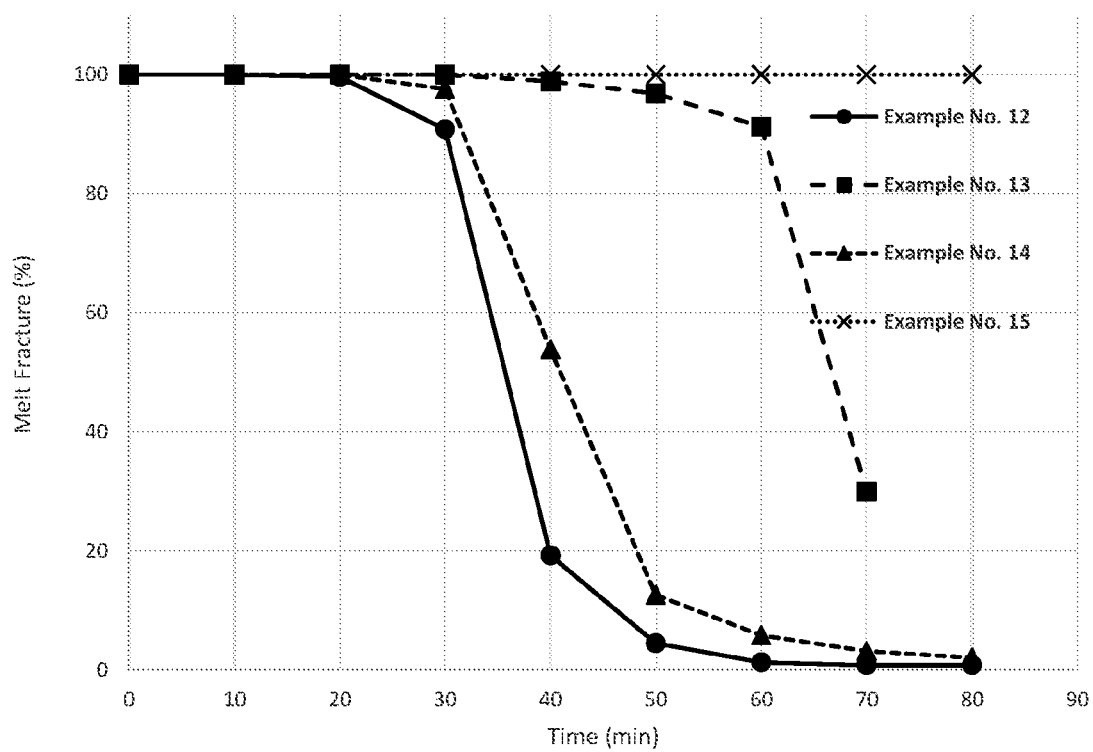

FLUOROPOLYMER FREE POLYMER PROCESSING AIDS

CROSS-REFERENCE TO RELATED APPLICATIONS

This application is a U.S. National Phase Application under 35 U.S.C. 371 of International Patent Application No. PCT/IB2022/055379, filed on Jun. 9, 2022, which in turn claims priority to and the benefit of U.S. Provisional Application No. 63/221,729, filed on Jul. 14, 2021, all of which are incorporated herein by reference in their entirety.

TECHNICAL FIELD

The present disclosure relates to processing aids for the extrusion of thermoplastic polyolefins and works well in the absence of fluorinated alkene based fluoropolymers.

BACKGROUND ART

During the extrusion of polyolefin polymers surface defects may occur including those referred to as sharkskin, snakeskin and orange peel, and each type of surface defect is generally related to the rheology of the polymer melt. A particularly severe form of surface defect which may occur is "melt fracture", which is believed to result when the shear rate at the surface of the polyolefin polymer is sufficiently high that the surface of the polymer begins to fracture. That is, there is a slippage of the surface of the extruded polymer relative to the body of the polymer melt. The surface generally cannot flow fast enough to keep up with the body of the extrudate and a fracture in the melt occurs resulting in a severe loss of surface properties for the extrudate polymer.

U.S. Pat. No. 3,125,547 discloses blends of polyethylene and small amounts of fluoropolymers to provide a smooth surface on a polyethylene extrudate at high extrusion speeds.

U.S. Pat. No. 3,222,314 discloses blends of polyethylene and low molecular weight polyethylene glycol to provide heat sealable film which is suitable for printing.

U.S. Pat. No. 4,013,622 teaches the use of low molecular weight polyethylene glycol to reduce the incidence of "breakdowns" during the manufacture of polyethylene film. Similarly, U.S. Pat. No. 4,540,538 teaches that pinstriping may be reduced during the extrusion of a polyolefin into film by the use of a combination of (i) a polyethylene glycol; (ii) a hindered phenolic antioxidant; and (iii) a selected inorganic antiblock material.

Further patents relate to the use of a combination of polyalkylene oxides and fluorocarbon polymers as a processing aid in extrusion of polyolefins. These patents include U.S. Pat. No. 4,855,360 which discloses and claims a composition of matter comprising the polyolefin and the processing aid and U.S. Pat. No. 5,015,693 which claims the processing aid per se. These patents demonstrate the use of relatively low molecular weight polyethylene glycols (e.g. having molecular weights of from about 400 Da to about 20,000 Da) in combination with fluorocarbon polymers as polymer processing aids and further, that in the absence of the fluoropolymer these polyethylene glycols were not very effective at reducing melt defects.

U.S. Pat. No. 6,294,604 describes the use of a combination of a fluoropolymer, a polyethylene glycol, and magnesium oxide as a polymer processing additive package.

Fluoroelastomers and fluoropolymers are expensive materials so there is an economic incentive to avoid their use. Further, perfluorinated alkanes and perfluorinated surfactant compounds, such as for example, perfluoroctane sulfonate and perfluorooctanoic acid, which are used during the production of fluoropolymers, are increasingly being recognized for possible negative environmental impacts.

In U.S. Pat. Appl. No. 2005/0070644, we disclosed that high molecular weight polyethylene glycol, in particular PEG having a molecular weight of greater than 20,000 g/mol, reduces melt fracture during polyolefin extrusions in the absence of fluoropolymers.

U.S. Pat. No. 10,982,079 also details the performance of polymer processing aids in the absence of added fluoropolymers. The polymer processing aid comprises a high molecular weight polyethylene glycol which has improved thermal stability by virtue of the inclusion of a metal salt of a carboxylic acid, a sulfonic acid, or an alkyl sulfate.

SUMMARY OF INVENTION

We now report that, the combination of a polyethylene glycol, even one of modest or low molecular weight, and a low density polyethylene made in a high pressure polymerization process, works well as a polymer processing aid during the extrusion of polyolefins in the absence of fluoropolymers.

The present disclosure provides a useful alternative to fluorinated alkene based polymer processing aids.

An embodiment is a process for preparing a thermoplastic composition extrudate, the process comprising extruding a thermoplastic composition in a melt extrusion process; the thermoplastic composition comprising: i) a linear polyethylene; ii) from 200 to 4,000 parts per million (based on the weight the linear polyethylene) of at least one polyethylene glycol; and iii) from 3.0 to 15.0 weight percent of a high pressure low density polyethylene, LDPE (based on the total weight of the linear polyethylene and the high pressure low density polyethylene, LDPE); wherein the linear polyethylene is selected from the group consisting of LLDPE, MDPE, VLDPE, HDPE, and mixtures thereof; wherein the thermoplastic composition is substantially free of fluoropolymers; and wherein the melt extrusion process is carried out in the absence of fluoropolymers.

An embodiment is a process for preparing a thermoplastic composition extrudate, the process comprising: a) preparing a thermoplastic composition by combining a linear polyethylene with i) 200 to 4,000 parts per million of at least one polyethylene glycol (based on the weight of the linear polyethylene) and ii) from 3.0 weight percent to 15.0 weight percent of a high pressure low density polyethylene, LDPE (based on the total weight of the linear polyethylene and the high pressure low density polyethylene, LDPE); and b) extruding the thermoplastic composition in a melt extrusion process; wherein the linear polyethylene is selected from the group consisting of LLDPE, MDPE, VLDPE, HDPE, and mixtures thereof; wherein the thermoplastic composition is substantially free of fluoropolymers; and wherein the melt extrusion process is carried out in the absence of fluoropolymers.

An embodiment is an extrudable thermoplastic composition comprising: i) a linear polyethylene; ii) from 200 to 4,000 parts per million (based on the weight the linear polyethylene) of at least one polyethylene glycol; and iii) from 3.0 to 15.0 weight percent of a high pressure low density polyethylene, LDPE (based on the total weight of the linear polyethylene and the high pressure low density polyethylene, LDPE); wherein the extrudable thermoplastic composition is substantially free of fluoropolymers; and wherein the linear polyethylene is selected from the group consisting of LLDPE, MDPE, VLDPE, HDPE, and mixtures thereof.

In an embodiment at least one polyethylene glycol is a polyethylene glycol having a weight average molecular weight, $M_w$ of less than 20,000 g/mol.

In an embodiment at least one polyethylene glycol is a polyethylene glycol having a weight average molecular weight, $M_w$ of at least 50,000 g/mol.

In an embodiment at least one polyethylene glycol is a polyethylene glycol having a weight average molecular weight, $M_w$ of from 25,000 to 50,000 g/mol.

In an embodiment of the disclosure, at least one polyethylene glycol is a first polyethylene glycol having a relatively low molecular weight, and a second polyethylene glycol having a relatively high molecular weight.

An alternative embodiment is a process for preparing a thermoplastic composition extrudate, the process comprising extruding a thermoplastic composition in a melt extrusion process; the thermoplastic composition comprising: i) a linear polyethylene; ii) a first polyethylene glycol having a weight average molecular weight, $M_w$ of from 2,000 to 10,000 g/mol; and iii) a second polyethylene glycol having a weight average molecular weight, $M_w$ of from 15,000 to 50,000 g/mol; wherein the linear polyethylene is selected from the group consisting of LLDPE, MDPE, VLDPE, HDPE, and mixtures thereof; wherein the thermoplastic composition is substantially free of fluoropolymers; and wherein the melt extrusion process is carried out in the absence of fluoropolymers.

An alternative embodiment is an extrudable thermoplastic composition comprising: i) a linear polyethylene; ii) a first polyethylene glycol having a weight average molecular weight, $M_w$ of from 2,000 to 10,000 g/mol; and iii) a second polyethylene glycol having a weight average molecular weight, $M_w$ of from 15,000 to 50,000 g/mol; wherein the extrudable thermoplastic composition is substantially free of fluoropolymers; and wherein the linear polyethylene is selected from the group consisting of LLDPE, MDPE, VLDPE, HDPE, and mixtures thereof.

An alternative embodiment is a process for preparing a thermoplastic composition extrudate, the process comprising: a) preparing a thermoplastic composition by combining a linear polyethylene with i) 200 to 2,000 parts per million (based on the weight of the linear polyethylene) of a first polyethylene glycol having a weight average molecular weight, $M_w$ of from 2,000 to 10,000 g/mol; and ii) 200 to 2,000 parts per million (based on the weight of the linear polyethylene) of a second polyethylene glycol having a weight average molecular weight, $M_w$ of from 15,000 to 50,000 g/mol; and b) extruding the thermoplastic composition in a melt extrusion process; wherein the linear polyethylene is selected from the group consisting of LLDPE, MDPE, VLDPE, HDPE, and mixtures thereof; wherein the thermoplastic composition is substantially free of fluoropolymers; and wherein the melt extrusion process is carried out in the absence of fluoropolymers.

In an embodiment a melt extrusion process is conducted at a shear rate which would produce a thermoplastic composition extrudate having melt fracture defects if carried out using a thermoplastic composition consisting essentially of a linear polyethylene.

In an embodiment a linear polyethylene comprises zinc oxide (ZnO).

In an embodiment a linear polyethylene comprises hydrotalcite.

In embodiments a linear polyethylene comprises a hydrotalcite having the formula: $[M^{2+}_{1-x}M^{3+}_x(OH)_2]^{x+}[(A^{n-})_{x/n} \cdot mH_2O]^{x-}$ where $M^{2+}$ is divalent Mg, Ni, Zn, Cu, or Mn; $M^{3+}$ is trivalent Al, Fe, or Cr; $A^{n-}$ is an anion such as for examples, $CO_3^{2-}$, or $SO_4^{2-}$, $NO_3^{2-}$, $Cl^{1-}$, or $OH^{1-}$; and x is from 0.1 to 0.5.

In an embodiment a linear polyethylene comprises a hydrotalcite having the formula: $Mg_6Al_2(OH)_{16}CO_3 \cdot nH_2O$.

In an embodiment a linear polyethylene comprises the mineral hydrotalcite ($Mg_6Al_2(OH)_{16}CO_3 \cdot 4H_2O$).

In an embodiment a linear polyethylene comprises a hindered phenol primary antioxidant, and a phosphorus-containing secondary antioxidant.

In an embodiment a high pressure low density polyethylene, LDPE has a melt index, $I_2$ of at least 2.5 grams per 10 minutes.

In an embodiment a high pressure low density polyethylene, LDPE has a melt index, $I_2$ of from 2.5 to 10.0 grams per 10 minutes.

In an embodiment a linear polyethylene is a LLDPE.

In an embodiment a LLDPE has a melt index, $I_2$ of from 0.1 to 5.0 grams per 10 minutes.

In an embodiment a LLDPE has a melt index, $I_2$ of from 0.5 to 5.0 grams per 10 minutes.

In an embodiment a LLDPE has a density of from 0.910 to 0.936 g/cm$^3$.

In an embodiment a LLDPE is an ethylene copolymer comprising polymerized ethylene and one or more alpha olefin selected from the group consisting of 1-butene, 1-hexene, and 1-octene.

In an embodiment a first polyethylene glycol has a weight average molecular weight, $M_w$ of less than 20,000 g/mol.

In an embodiment a first polyethylene glycol has a weight average molecular weight, $M_w$ of less than 10,000 g/mol.

In an embodiment a first polyethylene glycol has a weight average molecular weight, $M_w$ of from 2,000 to 10,000 g/mol.

In an embodiment a first polyethylene glycol has a weight average molecular weight, $M_w$ of from 2,000 to 8,000 g/mol.

In an embodiment a first polyethylene glycol has a weight average molecular weight, $M_w$ of from 2,000 to 5,000 g/mol.

In an embodiment a second polyethylene glycol has a weight average molecular weight, $M_w$ of at least 25,000 g/mol.

In an embodiment a second polyethylene glycol has a weight average molecular weight, $M_w$ of at least 50,000 g/mol.

In an embodiment a second polyethylene glycol has a weight average molecular weight, $M_w$ of from 25,000 to 50,000 g/mol.

In an embodiment a second polyethylene glycol has a weight average molecular weight, $M_w$ of from 15,000 to 25,000 g/mol.

In an embodiment a second polyethylene glycol has a weight average molecular weight, $M_w$ of from 250,000 to 350,000 g/mol.

BRIEF DESCRIPTION OF THE DRAWING

FIG. 1 shows the results of experiments (Examples 12, 13, 14 and 15) which assess the ability of various polymer processing aids to clear melt extrusion defects when extruding a thermoplastic composition comprising a linear low density polyethylene (LLDPE) in a blown film line melt extrusion process. In these experiments a monolayer blown film line equipped with a 3-inch diameter die was employed.

DESCRIPTION OF EMBODIMENTS

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms having a double bond at one end of the chain; an equivalent term is "linear α-olefin". An alpha-olefin may also be referred to as a comonomer.

As used herein, the terms "polyethylene" or "ethylene polymer", refers to macromolecules produced from ethylene monomers and optionally one or more additional monomers; regardless of the specific catalyst or specific process used to make the ethylene polymer. In the polyethylene art, the one or more additional monomers are often called "comonomer(s)" and typically include α-olefins. The term "homopolymer" generally refers to a polymer that contains only one type of monomer. The term "copolymer" refers to a polymer that contains two or more types of monomer. Common polyethylene types include high pressure low density polyethylene (LDPE), high density polyethylene (HDPE); medium density polyethylene (MDPE); linear low density polyethylene (LLDPE); and very low density polyethylene (VLPDE) or ultralow density polyethylene (ULPDE) which are also known as plastomers and elastomers. The term polyethylene also includes polyethylene terpolymers which may include two or more comonomers in addition to ethylene. The term polyethylene also includes combination of, or blends of, the polyethylene types described above.

The term "fluoropolymers" in the present disclosure refers to homopolymers and copolymers of fluorinated olefins. The fluorinated olefins may have a fluorine atom to carbon ratio of at least 1:2, or in some embodiments at least 1:1. Homopolymers include for example, those derived from vinylidene fluoride and vinyl fluoride. Copolymers include, for example those derived from vinylidene fluoride and one or more additional olefins, which can be fluorinated, such as for example hexafluoropropylene or non-fluorinated, such as for example propylene. Non-limiting examples of "fluoropolymers" as the term is used in the present disclosure include those described, for example, in U.S. Pat. Nos. 2,968,649; 3,051,677; 3,318,854; 5,015,693; 4,855,360; 5,710,217; 6,277,919; 7,375,157; and U.S. Pat. Appl. Pub. No. 2010/0311906. Some examples of commercially available fluoropolymers, include for example, copolymers of hexafluoropropylene and vinylidene fluoride which are available under the tradenames "DYNAMARX FX 9613" and "DYNAMAR FX 9614"; and copolymers of vinylidene fluoride, tetrafluoroethylene, and hexafluoropropylene available under the tradenames "DYNAMAR FX 5911" and "DYNAMAR FX 5912". Other commercially available fluoropolymers include "VITON® A", "VITON FREEFLOW™", "DAI-EL®", and "KYNAR®" all of which are available in various grades.

In the present disclosure, the terms polyalkylene oxide, poly(oxyalkylene), and polyalkylene glycol are used interchangeably. Accordingly, the terms polyethylene oxide, poly(oxyethylene), and polyethylene glycol are also used interchangeably; as are the terms polypropylene oxide, poly(oxypropylene) and polypropylene glycol.

The term "film" is used herein to mean a film having one or more layers which is formed by the extrusion of a polymer through one or more die openings. The term "film structure" is used to connote that a film has more than one layer (i.e. a film structure may have at least two layers, at least three layers, at least four layers, at least five layers, etc.).

"Alkyl group" and the prefix "alk-" are inclusive of both straight chain and branched chain groups and of cyclic groups having up to 30 carbons unless otherwise specified. Cyclic groups can be monocyclic or polycyclic and, in some embodiments, have from 3 to 10 ring carbon atoms.

The phrase "interrupted by one or more ether linkages", for example, with regard to an alkyl, alkylene, or arylalkylene refers to having part of the alkyl, alkylene, or arylalkylene on both sides of the functional group. An example of an alkylene that is interrupted with —O— is —$CH_2$—$CH_2$—O—$CH_2$—$CH_2$—.

The term "aryl" as used herein includes carbocyclic aromatic rings or ring systems, for example, having 1, 2, or 3 rings, optionally containing at least one heteroatom (e.g., O, S, or N) in the ring, and optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, oxazolyl, and thiazolyl. "Arylalkylene" refers to an "alkylene" moiety to which an aryl group is attached. "Alkylarylene" refers to an "arylene" moiety to which an alkyl group is attached.

In embodiments of the present disclosure, the extrusion of a thermoplastic polyolefin is improved ("aided") by using a polymer processing aid (PPA).

In embodiments of the disclosure, one or more components of a polymer processing aid can be admixed (e.g. pre-mixed), or pre-blended (e.g. dry blended or melt blended) with a thermoplastic polyolefin followed by extrusion of the polyolefin.

In embodiments of the disclosure, one or more components of a polymer processing aid can be co-fed with a thermoplastic polyolefin to an extruder.

In embodiments of the disclosure one or more components of a polymer processing aid can be added to a thermoplastic polyolefin to prepare a masterbatch of the polyolefin containing the one or more components of a polymer processing aid. The resulting polyolefin masterbatch can then be used to introduce the one or more components of a polymer processing aid into a thermoplastic polyolefin in any conventional manner prior to extrusion of the polyolefin (e.g. dry blending or melt blending) or during the extrusion of the polyolefin (e.g. co-feeding with a polyolefin to an extruder).

The Polymer Processing Aid

In an embodiment of the disclosure, a polymer processing aid (PPA), used to aid the extrusion of a thermoplastic polyolefin, comprises: i) at least one poly(oxyalkylene) polymer, also known as polyalkylene glycol (PAG) and ii) a high pressure low density polyethylene (LDPE).

In an embodiment of the disclosure, a polymer processing aid (PPA), used to aid the extrusion of a thermoplastic polyolefin, comprises: i) at least one poly(oxyethylene) polymer, also known as polyethylene glycol (PEG) and ii) a high pressure low density polyethylene (LDPE).

In an embodiment of the disclosure, a polymer processing aid (PPA), used to aid the extrusion of a thermoplastic polyolefin, comprises: i) a poly(oxyethylene) polymer, also known as polyethylene glycol (PEG) having a weight average molecular weight, $M_W$ of less than 20,000 g/mol and ii) a high pressure low density polyethylene (LDPE).

In an embodiment of the disclosure, a polymer processing aid (PPA), used to aid the extrusion of a thermoplastic polyolefin, comprises: i) a poly(oxyethylene) polymer, also known as polyethylene glycol (PEG) having a weight average molecular weight, $M_W$ of at least 50,000 g/mol and ii) a high pressure low density polyethylene (LDPE).

In an embodiment of the disclosure, a polymer processing aid (PPA), used to aid the extrusion of a thermoplastic polyolefin, comprises: i) a poly(oxyethylene) polymer, also known as polyethylene glycol (PEG) having a weight average molecular weight, $M_W$ of from 25,000 to 50,000 g/mol and ii) a high pressure low density polyethylene (LDPE).

In an embodiment of the disclosure, a polymer processing aid (PPA), used to aid the extrusion of a thermoplastic polyolefin, comprises: i) at least one poly(oxypropylene) polymer, also known as polypropylene glycol (PPG) and ii) a high pressure low density polyethylene (LDPE).

In an embodiment of the disclosure, a polymer processing aid (PPA), used to aid the extrusion of a thermoplastic polyolefin, comprises: i) a relatively low molecular weight poly(oxyalkylene) polymer; ii) a relatively high molecular weight poly(oxyalkylene) polymer; and iii) a high pressure low density polyethylene (LDPE).

In an embodiment of the disclosure, a polymer processing aid (PPA), used to aid the extrusion of a thermoplastic polyolefin, comprises: i) a relatively low molecular weight poly(oxyethylene) polymer; ii) a relatively high molecular weight poly(oxyethylene) polymer; and iii) a high pressure low density polyethylene (LDPE).

In an embodiment of the disclosure, a polymer processing aid (PPA), used to aid the extrusion of a thermoplastic polyolefin, comprises: i) a relatively low molecular weight poly(oxypropylene) polymer; ii) a relatively high molecular weight poly(oxypropylene) polymer; and iii) a high pressure low density polyethylene (LDPE).

In an embodiment of the disclosure, a polymer processing aid (PPA), used to aid the extrusion of a thermoplastic polyolefin, comprises: i) a first poly(oxyalkylene) polymer having a weight average molecular weight, Mw of less than 25,000 g/mol; ii) a second poly(oxyalkylene) polymer having a weight average molecular weight, $M_w$ of at least 25,000 g/mol; and iii) a high pressure low density polyethylene (LDPE).

In an embodiment of the disclosure, a polymer processing aid (PPA), used to aid the extrusion of a thermoplastic polyolefin, comprises: i) at first poly(oxyalkylene) polymer having a weight average molecular weight, Mw of less than 10,000 g/mol; ii) a second poly(oxyalkylene) polymer having a weight average molecular weight, Mw of from 15,000 to 50,000 g/mol; and iii) a high pressure low density polyethylene (LDPE).

In an embodiment of the disclosure, a polymer processing aid (PPA), used to aid the extrusion of a thermoplastic polyolefin, comprises: i) at first poly(oxyalkylene) polymer having a weight average molecular weight, Mw of from 2,000 to 10,000 g/mol; ii) a second poly(oxyalkylene) polymer having a weight average molecular weight, Mw of from 15,000 to 25,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyalkylene) polymer having a weight average molecular weight, Mw of from 2,000 to 10,000 g/mol; ii) a second poly(oxyalkylene) polymer having a weight average molecular weight, Mw of from 25,000 to 50,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyalkylene) polymer having a weight average molecular weight, Mw of from 2,000 to 10,000 g/mol; ii) a second poly(oxyalkylene) polymer having a weight average molecular weight, Mw of from 250,000 to 350,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyalkylene) polymer having a weight average molecular weight, Mw of less than 10,000 g/mol; ii) a second poly(oxyalkylene) polymer having a weight average molecular weight, Mw of at least 50,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyalkylene) polymer having a weight average molecular weight, Mw of less than 20,000 g/mol; ii) a second poly(oxyalkylene) polymer having a weight average molecular weight, Mw of at least 50,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyethylene) polymer having a weight average molecular weight, Mw of less than 25,000 g/mol; ii) a second poly(oxyethylene) polymer having a weight average molecular weight, Mw of at least 25,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyethylene) polymer having a weight average molecular weight, Mw of less than 10,000 g/mol; ii) a second poly(oxyethylene) polymer having a weight average molecular weight, Mw of from 15,000 to 50,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyethylene) polymer having a weight average molecular weight, Mw of from 2,000 to 10,000 g/mol; ii) a second poly(oxyethylene) polymer having a weight average molecular weight, Mw of from 15,000 to 50,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyethylene) polymer having a weight average molecular weight, Mw of from 2,000 to 10,000 g/mol; ii) a second poly(oxyethylene) polymer having a weight average molecular weight, Mw of from 15,000 to 25,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyethylene) polymer having a weight average molecular weight, Mw of from 2,000 to 10,000 g/mol; ii) a second poly(oxyethylene) polymer having a weight average molecular weight, Mw of from 25,000 to 50,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyethylene) polymer having a weight average molecular weight, Mw of from 2,000 to 10,000 g/mol; ii) a second poly(oxyethylene) polymer having a weight average molecular weight, Mw of from 250,000 to 350,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyethylene) polymer having a weight average molecular weight, Mw of less than 10,000 g/mol; ii) a second poly(oxyethylene) polymer having a weight average molecular weight, Mw of at least 50,000 g/mol; and iii) a high pressure low density polyethylene (LDPE).

In an embodiment of the disclosure, a polymer processing aid (PPA), used to aid the extrusion of a thermoplastic polyolefin, comprises: i) a first poly(oxyethylene) polymer having a weight average molecular weight, Mw of less than 20,000 g/mol; ii) a second poly(oxyethylene) polymer having a weight average molecular weight, Mw of at least 50,000 g/mol; and iii) a high pressure low density polyethylene (LDPE).

In an alternative embodiment of the disclosure, a polymer processing aid (PPA), used to aid the extrusion of a thermoplastic polyolefin, comprises: i) a first relatively low molecular weight poly(oxyalkylene) polymer and ii) a second relatively high molecular weight poly(oxyalkylene) polymer.

In an alternative embodiment of the disclosure, a polymer processing aid (PPA), used to aid the extrusion of a thermoplastic polyolefin, comprises: i) a first relatively low molecular weight poly(oxyethylene) polymer and ii) a second relatively high molecular weight poly(oxyethylene) polymer.

In an alternative embodiment of the disclosure, a polymer processing aid (PPA), used to aid the extrusion of a thermoplastic polyolefin, comprises: i) a first poly(oxyethylene) polymer having a weight average molecular weight, Mw of less than 10,000 g/mol and ii) a second poly(oxyethylene) polymer having a weight average molecular weight, Mw of from 15,000 to 50,000 g/mol.

In an alternative embodiment of the disclosure, a polymer processing aid (PPA), used to aid the extrusion of a thermoplastic polyolefin, comprises: i) a first poly(oxyethylene) polymer having a weight average molecular weight, Mw of less than 10,000 g/mol and ii) a second poly(oxyethylene) polymer having a weight average molecular weight, Mw of from 250,000 to 350,000 g/mol.

In an alternative embodiment of the disclosure, a polymer processing aid (PPA), used to aid the extrusion of a thermoplastic polyolefin, comprises: i) a first poly(oxyethylene) polymer having a weight average molecular weight, Mw of from 2,000 to 10,000 and ii) a second poly(oxyethylene) polymer having a weight average molecular weight, Mw of from 15,000 to 25,000 g/mol.

In an alternative embodiment of the disclosure, a polymer processing aid (PPA), used to aid the extrusion of a thermoplastic polyolefin, comprises: i) a first poly(oxyethylene) polymer having a weight average molecular weight, Mw of from 2,000 to 10,000 and ii) a second poly(oxyethylene) polymer having a weight average molecular weight, Mw of from 15,000 to 50,000 g/mol.

In an alternative embodiment of the disclosure, a polymer processing aid (PPA), used to aid the extrusion of a thermoplastic polyolefin, comprises: i) a first poly(oxyethylene) polymer having a weight average molecular weight, Mw of from 2,000 to 10,000 and ii) a second poly(oxyethylene) polymer having a weight average molecular weight, Mw of from 25,000 to 50,000 g/mol.

In an alternative embodiment of the disclosure, a polymer processing aid (PPA), used to aid the extrusion of a thermoplastic polyolefin, comprises: i) a first poly(oxyethylene) polymer having a weight average molecular weight, Mw of from 2,000 to 10,000 and ii) a second poly(oxyethylene) polymer having a weight average molecular weight, Mw of from 250,000 to 350,000 g/mol.

In alternative embodiments of the disclosure, a polymer processing aid (PPA), used to aid the extrusion of a thermoplastic polyolefin, comprises: i) a first poly(oxyethylene) polymer having a weight average molecular weight, Mw of from 2,000 to 8,000 g/mol, or a first poly(oxyethylene) polymer having a weight average molecular weight, Mw from 2,000 to 5000 g/mol; and ii) a second poly(oxyethylene) polymer having a weight average molecular weight, Mw of from 15,000 to 25,000 g/mol, or a second poly(oxyethylene) polymer having a weight average molecular weight, Mw from 25,000 to 50,000 g/mol.

In an alternative embodiment of the disclosure, a polymer processing aid (PPA), used to aid the extrusion of a thermoplastic polyolefin, comprises: i) a first poly(oxyethylene) polymer having a weight average molecular weight, Mw of about 3,350 g/mol and ii) a second poly(oxyethylene) polymer having a weight average molecular weight, Mw of about 35,000 g/mol.

In an embodiment of the disclosure, a polymer processing aid (PPA), used to aid the extrusion of a thermoplastic polymer is further characterized by the substantial absence of perfluoroalkane compounds, fluoroelastomers, and fluoropolymers.

An embodiment of the disclosure is characterized by the substantial absence of perfluoroalkane compounds, fluoroelastomers, and fluoropolymers in an extrudable thermoplastic composition.

An embodiment of the disclosure is a process for preparing a thermoplastic composition extrudate which comprises melt extruding the thermoplastic composition in a melt extrusion process; where the thermoplastic composition is characterized by the substantial absence of perfluoroalkane compounds, fluoroelastomers, and fluoropolymers and where the melt extrusion process is carried out in the absence of perfluoroalkane compounds, fluoroelastomers, and fluoropolymers.

In embodiments of the disclosure, melt extrusion processes include film extrusion, extrusion blow molding, injection molding, pipe extrusion, wire extrusion, cable extrusion, and fiber extrusion, all of which are well known to persons skilled in the art.

The Poly(Oxyalkylene) Polymer

In an embodiment of the present disclosure, a polymer processing aid will comprise at least one poly(oxyalkylene) polymer, also known as polyalkylene glycol (PAG) or polyalkylene oxide.

In an embodiment of the present disclosure, a polymer processing aid will comprise at least one poly(oxyethylene) polymer, also known as polyethylene glycol or polyethylene oxide.

In an embodiment of the present disclosure, a polymer processing aid will comprise at least one poly(oxypropylene) glycol, also known as polypropylene glycol or polypropylene oxide.

A poly(oxyalkylene) polymer, can in embodiments of the disclosure be represented by formula $A[(OR^1)_xOR^2]_y$, wherein A is typically alkylene interrupted by one or more ether linkages, y is 2 or 3, $(OR^1)_x$ is a poly(oxyalkylene) chain having a plurality (x) of oxyalkylene groups, $OR^1$, wherein each $R^1$ is independently $C_2$ to $C_5$ alkylene, in some embodiments, $C_2$ to $C_3$ alkylene, $R^2$ is hydrogen, alkyl, aryl, arylalkenyl, alkylarylenyl, —C(O)-alkyl, —C(O)-aryl, —C(O)-arylalkenyl, or —C(O)-alkylarylenyl, wherein-C(O)— is bonded to the O of $OR^2$.

In an embodiment of the disclosure, a poly(oxyalkylene) polymer, can in embodiments of the disclosure be represented by formula $A[(OR^1)_xOR^2]_y$, wherein A is typically alkylene interrupted by one or more ether linkages, y is 2 or 3, $(OR^1)_x$ is a poly(oxyalkylene) chain having a plurality (x) of oxyalkylene groups, $OR^1$, wherein each $R^1$ is independently $C_2$ to $C_5$ alkylene, in some embodiments, $C_2$ to $C_3$ alkylene, $R^2$ is hydrogen, alkyl, aryl, arylalkenyl, alkylarylenyl, —C(O)-alkyl, —C(O)-aryl, —C(O)-arylalkenyl, or —C(O)-alkylarylenyl, wherein —C(O)— is bonded to the O of $OR^2$.

In an embodiment of the disclosure, a poly(oxyalkylene) polymer can be a homopolymer such as a poly(oxyethylene) polymer (also called a polyethylene glycol in the present disclosure) in which each $R^1$ is —$CH_2CH_2$—, or a homopolymer such as a poly(oxypropylene) polymer in which each $R^1$ is —$C_3H_6$—.

In another embodiment of the disclosure, a poly(oxyalkylene) polymer is a poly(oxyalkylene) polymer comprising a chain of randomly distributed oxyalkylene groups (e.g., a copolymer comprising —$OC_2H_4$— and —$OC_3H_6$— units) or having alternating blocks of repeating oxyalkylene groups (e.g., a copolymer comprising (—$OC_2H_4$—)$_a$ and (—$OC_3H_6$—)$_b$ blocks, wherein a+b is x).

Poly(oxyalkylene) copolymers comprising randomly distributed, or alternating units of (—$OC_2H_4$—) and (—$OC_3H_6$—) or blocks of (—$OC_2H_4$—)$_a$ and (—$OC_3H_6$—)$_b$ are sometimes referred to as "poloxamers" and are available commercially under the tradenames PLURONIC®, KOLLIPHOR® and SYNPERONIC®.

In some embodiments of the disclosure, A is ethylene, —$CH_2$—CH(-)—$CH_2$— (derived from glycerol), $CH_3CH_2C(CH_2$—)$_3$ (derived from 1,1,1-trimethylol propane), poly(oxypropylene), —$CH_2CH_2$—O—$CH_2CH_2$—, or —$CH_2CH_2$—O—$CH_2CH_2$—O—$CH_2CH_2$—.

In some embodiments of the disclosure, $R^2$ is hydrogen, methyl, butyl, phenyl, benzyl, acetyl, benzoyl, or stearyl.

In other embodiments of the disclosure, poly(oxyalkylene) polymers are polyesters prepared, for example, from dicarboxylic acids and poly(oxyalkylene) polymers represented by formula $A[(OR^1)_xOR^2]_y$, wherein A, $R^1$, and x are as defined above, $R^2$ is hydrogen, and y is 2.

In an embodiment of the disclosure, the major proportion of a poly(oxyalkylene) polymer by weight will be the repeating oxyalkylene groups, $(OR^1)$.

In an embodiment of the disclosure, poly(oxyalkylene) polymer is a polyethylene glycol (PEG). Polyethylene glycol (PEG) can be represented by formula H(O—$CH_2CH_2$—)$_x$OH. Many polyethylene glycols, as well as their ethers, and their esters are commercially available and they are all contemplated for use in embodiments of the present disclosure.

The weight average molecular weights (e.g. Mn and Mw) of a polyalkylene glycol such as a polyethylene glycol (PEG) can be measured, for example, by gel permeation chromatography (i.e., size exclusion chromatography) using narrow molecular weight distribution poly(oxyalkylene) polymers (e.g. polyethylene glycols) as standards with techniques known in the art.

In embodiments of the disclosure, a polyalkylene glycol (PAG) has a value of x such that the weight average molecular weight, Mw of the polyalkylene glycol polymer is at least about 20,000 g/mol, or at least about 30,000 g/mol, or at least about 40,000 g/mol, or at least about 50,000 g/mol, or at least about 60,000 g/mol.

In embodiments of the disclosure, a polyalkylene glycol (PAG) has a value of x such that the weight average molecular weight, Mw of the polyalkylene glycol polymer has an upper limit of about 500,000 g/mol, or about 450,000 g/mol, or about 400,000 g/mol, or about 350,000 g/mol, or about 300,000 g/mol.

In embodiments of the disclosure, a polyalkylene glycol (PAG) has a value of x such that the weight average molecular weight, Mw of the polyethylene glycol polymer is from about 60,000 g/mol to about 500,000 g/mol, or from about 75,000 g/mol to about 500,000 g/mol, or from about 60,000 g/mol to about 450,000 g/mol, or from about 75,000 g/mol to about 450,000 g/mol, or from about 80,000 g/mol to about 500,000 g/mol, or from about 80,000 g/mol to about 450,000 g/mol, or from about 85,000 g/mol to about 500,000 g/mol, or from about 60,000 g/mol to about 400,000 g/mol, or from about 60,000 g/mol, to about 350,000 g/mol, or from about 70,000 g/mol to about 400,000 g/mol, or from about 70,000 g/mol to about 350,000 g/mol, or from about 100,000 g/mol to about 350,000 g/mol, or from about 150,000 g/mol to about 350,000 g/mol, or from about 200,000 g/mol to about 350,000 g/mol, or from about 250,000 g/mol to about 350,000 g/mol.

In embodiments of the disclosure, a polyalkylene glycol (PAG) has a value of x such that the weight average molecular weight, Mw of the polyalkylene glycol polymer is less than 20,000 g/mol, or less than 15,000 g/mol, or less than 10,000 g/mol, or less than 5,000 g/mol.

In embodiments of the disclosure, a polyalkylene glycol (PAG) has a value of x such that the weight average molecular weight, Mw of the polyalkylene glycol polymer is from about 200 g/mol to about 20,000 g/mol, or from about 400 g/mol to about 15,000 g/mol, or from about 400 g/mol to about 10,000 g/mol, or from about 400 g/mol to about 7,500 g/mol, or from about 400 g/mol to about 5,000 g/mol.

In embodiments of the disclosure, a polyalkylene glycol (PAG) has a value of x such that the weight average molecular weight, Mw of the polyalkylene glycol polymer is from about 1,000 g/mol to about 20,000 g/mol, or from about 2,000 g/mol to about 20,000 g/mol, or from about 1,000 g/mol to about 15,000 g/mol, or from about 2,000 g/mol to about 15,000 g/mol, or from about 1,000 g/mol to about 10,000 g/mol, or from about 2,000 g/mol to about 10,000 g/mol.

In embodiments of the disclosure, a polyalkylene glycol (PAG) has a value of x such that the weight average molecular weight, Mw of the polyalkylene glycol polymer is from about 10,000 g/mol to about 50,000 g/mol, or from about 15,000 g/mol to about 50,000 g/mol, or from about 20,000 g/mol to about 50,000 g/mol, or from about 25,000 g/mol to about 50,000 g/mol, or from about 20,000 g/mol to about 40,000 g/mol, or from about 25,000 g/mol to about 35,000 g/mol, or from about 15,000 g/mol to about 35,000 g/mol, or from about 15,000 g/mol to about 30,000 g/mol, or from about 15,000 g/mol to about 25,000 g/mol.

In embodiments of the disclosure, a polyethylene glycol (PEG) has a value of x such that the weight average molecular weight, Mw of the polyethylene glycol polymer is at least about 20,000 g/mol, or at least about 30,000 g/mol, or at least about 40,000 g/mol, or at least about 50,000 g/mol, or at least about 60,000 g/mol.

In embodiments of the disclosure, a polyethylene glycol (PEG) has a value of x such that the weight average molecular weight, Mw of the polyethylene glycol polymer has an upper limit of about 500,000 g/mol, or about 450,000 g/mol, or about 400,000 g/mol, or about 350,000 g/mole, or about 300,000 g/mol.

In embodiments of the disclosure, a polyethylene glycol (PEG) has a value of x such that the weight average molecular weight, Mw of the polyethylene glycol polymer is from about 60,000 g/mol to about 500,000 g/mol, or from about 75,000 g/mol to about 500,000 g/mol, or from about 60,000 g/mol to about 450,000 g/mol, or from about 75,000 g/mol to about 450,000 g/mol, or from about 80,000 g/mol to about 500,000 g/mol, or from about 80,000 g/mol to about 450,000 g/mol, or from about 85,000 g/mol to about 500,000 g/mol, or from about 60,000 g/mol to about 400,000 g/mol, or from about 60,000 g/mol, to about 350,000 g/mol, or from about 70,000 g/mol to about 400,000 g/mol, or from about 70,000 g/mol to about 350,000 g/mol, or from about 100,000 g/mol to about 350,000 g/mol, or from about 150,000 g/mol to about 350,000 g/mol, or from about 200,000 g/mol to about 350,000 g/mol, or from about 250,000 g/mol to about 350,000 g/mol.

In embodiments of the disclosure, a polyethylene glycol (PEG) has a value of x such that the weight average molecular weight, Mw of the polyethylene glycol polymer is less than 20,000 g/mol, or less than 15,000 g/mol, or less than 10,000 g/mol, or less than 5,000 g/mol.

In embodiments of the disclosure, a polyethylene glycol (PEG) has a value of x such that the weight average molecular weight, Mw of the polyethylene glycol polymer is from about 200 g/mol to about 20,000 g/mol, or from about 400 g/mol to about 15,000 g/mol, or from about 400 g/mol to about 15,000 g/mol, or from about 400 g/mol to about 10,000 g/mol, or from about 400 g/mol to about 7,500 g/mol, or from about 400 g/mol to about 5,000 g/mol.

In embodiments of the disclosure, a polyethylene glycol (PEG) has a value of x such that the weight average molecular weight, Mw of the polyethylene glycol polymer is from about 1,000 g/mol to about 20,000 g/mol, or from about 2,000 g/mol to about 20,000 g/mol, or from about 1,000 g/mol to about 15,000 g/mol, or from about 2,000 g/mol to about 15,000 g/mol, or from about 1,000 g/mol to about 10,000 g/mol, or from about 2,000 g/mol to about 10,000 g/mol.

In embodiments of the disclosure, a polyethylene glycol (PEG) has a value of x such that the weight average molecular weight, Mw of the polyethylene glycol polymer is from about 10,000 g/mol to about 50,000 g/mol, or from about 15,000 g/mol to about 50,000 g/mol, or from about 20,000 g/mol to about 50,000 g/mol, or from about 25,000 g/mol to about 50,000 g/mol, or from about 20,000 g/mol to about 40,000 g/mol, or from about 25,000 g/mol to about 35,000 g/mol, or from about 15,000 g/mol to about 35,000 g/mol, or from about 15,000 g/mol to about 30,000 g/mol, or from about 15,000 g/mol to about 25,000 g/mol.

In an embodiment of the disclosure, a polyethylene glycol (PEG) has a weight average molecular weight of at least 20,000 g/mol, or at least 25,000 g/mol.

In an embodiment of the disclosure, a polyethylene glycol (PEG) has a weight average molecular weight of from about 20,000 g/mol to about 50,000 g/mol.

In embodiments of the disclosure, a polyethylene glycol (PEG) has a weight average molecular weight of from about 100,000 g/mol to about 500,000 g/mol, or from about 150,000 g/mol to about 450,000 g/mol, or from about 200,000 g/mol to about 400,000 g/mol.

In an embodiment of the disclosure, a polyethylene glycol (PEG) commercially available under the trademark carbo is used as a polymer processing aid.

In an embodiments of the disclosure, a polyethylene glycol (PEG) commercially available under the trademark CARBOWAX® or PLURIOL® is used as a polymer processing aid.

In an embodiment of the disclosure, a polymer processing aid will comprise at least two polyalkylene glycols of different weight average molecular weight, $M_w$.

In an embodiment of the disclosure, a polymer processing aid will comprise at least two polyethylene glycols of different weight average molecular weight, $M_w$.

In an embodiment of the disclosure, a polymer processing aid will comprise at least two polyethylene glycols of different weight average molecular weight, $M_w$, where a first polyethylene glycol has a weight average molecular weight, $M_w$, of less than 10,000 g/mol, and a second polyethylene glycol has weight average molecular weight, $M_w$ of greater than 25,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of less than 25,000 g/mol, and a second polyethylene glycol has weight average molecular weight, $M_w$ of at least 25,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of less than 25,000 g/mol, and a second polyethylene glycol has weight average molecular weight, $M_w$ of at least 250,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of less than 10,000 g/mol, and a second polyethylene glycol has weight average molecular weight, $M_w$ of at least 250,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of from about 2,000 to about 10,000 g/mol, and a second polyethylene glycol has weight average molecular weight, $M_w$ of from about 25,000 to about 350,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of from about 2,000 to about 10,000 g/mol, and a second polyethylene glycol has weight average molecular weight, $M_w$ of from about 15,000 to about 50,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of from about 2,000 to about 10,000 g/mol, and a second polyethylene glycol has weight average molecular weight, $M_w$ of from about 15,000 to about 25,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of from about 2,000 to about 10,000 g/mol, and a second polyethylene glycol has weight average molecular weight, $M_w$ of from about 25,000 to about 50,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of from about 2,000 to about 10,000 g/mol, and a second polyethylene glycol has weight average molecular weight, $M_w$ of from about 250,000 to about 350,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of less than 10,000 g/mol, and a second polyethylene glycol has weight average molecular weight, $M_w$ of greater than 10,000 g/mol.

In an embodiment of the disclosure, a polymer processing aid will comprise at least two polyethylene glycols of different weight average molecular weight, $M_w$, where a first polyethylene glycol has a weight average molecular weight, $M_w$, of less than about 10,000 g/mol, and a second polyethylene glycol has weight average molecular weight, $M_w$ of at least about 50,000 g/mol.

In an embodiment of the disclosure, a polymer processing aid will comprise at least two polyethylene glycols of different weight average molecular weight, $M_w$, and the difference in weight average molecular weight, $M_w$ between the at least two polyethylene glycols will be in the range of from 2:1 to 100,000:1 including any sub range encompassed within this range and any value within this range. For example, in embodiments of the disclosure, a polymer processing aid will comprise at least two polyethylene glycols of different weight average molecular weight, $M_w$, and the difference in weight average molecular weight, $M_w$ between the at least two polyethylene glycols will be in the range of from 5:1 to 100,000:1, or from 2:1 to 1000:1, or from 5:1 to 1000:1, or from 2:1 to 500:1, or from 5:1 to 500:1, or from 2:1 to 100:1, or from 5:1 to 100:1.

In an embodiment of the disclosure, a polymer processing aid will comprise at least two polyethylene glycols of different weight average molecular weight, $M_w$, and the at least two polyethylene glycols having different $M_w$, will be present in a mole ratio of from 1:99 to 99:1 including any sub range encompassed within this range and any value within this range. For example, in embodiments of the disclosure, a polymer processing aid will comprise at least two polyethylene glycols of different weight average molecular weight, $M_w$, in a mole ratio of from 5:95 to 95:5, or from 10:90 to 90:10, or from 20:80 to 80:20, or from 25:75 to 75:25, or from 35:65 to 65:35, or from 40:60 to 60:40, or about 50:50.

In an embodiment of the disclosure, the amount of polyalkylene glycol (PAG) or the amount of polyethylene glycol (PEG) used as a polymer processing aid (PPA) will be from 100 to 5,000 parts per million by weight (based on the weight of a thermoplastic polyolefin such as a linear polyethylene) including any sub range within this range and any value within this range. Further optimized PPA addition levels and ranges for a given extrusion process may be readily determined by those skilled in the art. For example, in certain embodiments, the amount of polyalkylene glycol (PAG) or the amount of polyethylene glycol (PEG) used as a polymer processing aid (PPA) will be from 100 to 4,000 parts per million by weight, or 100 to 3,000 parts per million by weight, or from 200 to 3,000 parts per million by weight, or from 100 to 2,000 parts per million by weight, or from 200 to 2,000 parts per million by weight, or from 300 to 2,000 parts per million by weight, or from 400 to 2,000 parts per million by weight, or from 200 to 1,500 parts per million by weight, or from 300 to 1,500 parts per million by weight, or from 400 to 1,500 parts per million by weight, or from 200 to 1,200 parts per million by weight, or from 300 to 1,200 parts per million by weight, or from 400 to 1,200 parts per million by weight (based on the weight of the thermoplastic polyolefin such as a linear polyethylene).

In an embodiment of the disclosure, a polyalkylene glycol (PAG) or a polyethylene glycol (PEG) is added to a thermoplastic polyolefin (e.g. a linear polyethylene) using a masterbatch formulation containing the PAG or PEG. The term masterbatch is well known to persons skilled in the art. Generally, the term "masterbatch" refers to the practice of first melt mixing an additive, for example, a PEG, with a small amount of a given thermoplastic (e.g. a linear polyethylene), followed by blending (by for example melt mixing or dry blending) the resulting "masterbatch" with the remaining bulk of the thermoplastic (e.g. the linear polymer).

In embodiments of the disclosure, from about 0.1 to about 15.0 weight percent, or from about 0.5 to about 15.0 weight percent, or from about 0.5 to about 10.0 weight percent, or from about 0.1 to about 10.0 weight percent, or from about 0.1 to about 7.5 weight percent, or from about 0.5 to about 7.5 weight percent or from about 0.5 to about 5.0 weight percent, or from about 0.1 to about 5.0 weight percent, or from about 1.0 to about 15.0 weight percent, or from about 1.0 to about 5.0 weight percent, or from about 1.0 to about 7.5 weight percent, or from about 1.0 to about 5.0 weight percent, or from about 0.1 to about 2.5 weight percent, or from about 0.5 to about 2.5 weight percent of a masterbatch will be used in a blend with the bulk polymer (where weight percent of the masterbatch is based on the combined weight of the masterbatch and the bulk polymer).

In embodiments of the present disclosure, a masterbatch (e.g. of a linear polyethylene) may contain an amount of PAG or PEG in the range of from 500 to 50,000 parts per million by weight (based on the weight of the masterbatch) including subranges within this range and any number within this range. For example, in further embodiments of the disclosure, a masterbatch may contain an amount of PAG or PEG in the range of from 500 to 40,000 ppm, or from 500 to 35,000 ppm, or from 500 to 40,000 ppm, or from 500 to 25,000 ppm, or from 1,000 to 40,000 ppm, or from 1,000 to 35,000 ppm, or from 1,000 to 30,000 ppm, or from 1,000 to 25,000 parts per million by weight (based on the weight of the masterbatch), or from 5,000 to 25,000 ppm, or from 1,000 to 20,000 ppm, or from 2,000 to 20,000 ppm, or from 3,000 to 20,000, or from 4,000 to 20,000 ppm, or from 5,000 to 20,000 ppm, or from 5,000 to 17,500, or from 5,000 to 15,000 or from 5,000 to 12,500 ppm, or from 2,500 to 15,000 ppm, or from 5,000 to 15,000 ppm, or from 7,500 to 15,000 ppm, or from 7,500 ppm to 12,500 ppm, or from 5,000 to 50,000 ppm, or from 7,500 to 50,000 ppm, or from 10,000 to 50,000 ppm, or from 10,000 to 35,000 ppm, or from 10,000 to 25,000 ppm, or from 5,000 to 35,000 ppm, or from 5,000 to 30,000 ppm, or from 5,000 to 25,000 ppm, or from 15,000 to 30,000 ppm, or from 17,500 to 27,500 ppm, or from 20,000 to 25,000 ppm.

The polyalkylene glycol or the polyethylene glycol used as a polymer processing aid (PPA) may be used in the form of a semi solid or a viscous liquid, or as powders, pellets, or granules.

The High Pressure Low Density Polyethylene (LDPE)

In an embodiment of the present disclosure, a polymer processing aid will comprise a high pressure low density polyethylene, LDPE.

In the present disclosure, high pressure low density polyethylene (LDPE), is an ethylene homopolymer and is prepared by the free radical homopolymerization of ethylene.

Without wishing to be bound by theory, LDPE has high degrees of so called long chain branching (which may be as long as the main polymer backbone) and which gives the LDPE a non-linear microstructure. Accordingly, high pressure low density polyethylene (LDPE) is distinct from linear polyethylene which is made using ethylene polymerization catalysts, as further described below, and which has a linear polymer microstructure. Further description of the high pressure low density polyethylene, LDPE used in the present disclosure is found in the Kirk-Othmer Encyclopedia of Chemical Technology, in the chapter titled *Polyethylene, Low Density* by Norma Maraschin, First Published Mar. 18, 2005, which description is incorporated herein in its entirety by reference.

In embodiments of the disclosure, a high pressure low density polyethylene (LDPE), is prepared in either a tubular reactor or an autoclave reactor.

A tubular reactor operates in a continuous mode and at high pressures and temperatures. Typical operating pressures for a tubular reactor are from 2000 to 3500 bar. Operating temperatures can range from 140 to 340° C. The reactor is designed to have a large length to diameter ratio (for example, from 400 to 40,000) and may have multiple reaction zones which take the shape of an elongated coil. High gas velocities (at least 10 m/s) are used to provide optimal heat transfer. Conversions for multi-zone systems are typically 22 to 30% per pass but can be as high as 36 to 40%. Tubular reactors may have multiple injection points for the addition of monomer or initiators to different reaction zones having different temperatures.

An autoclave reactor may have a length to diameter ratio of between 2 and 20 and may be single stage or multistage. Typically, low temperature ethylene is passed into a hot reaction zone and conversion may be controlled by the temperature differential between the incoming ethylene gas and the temperature of the autoclave reactor. Conversions are usually lower in an autoclave reactor, up to 23% per pass, than in a tubular reactor which has a higher capacity to remove the heat of polymerization. Typical operating pressures for autoclave reactors are from 1,100 to 2,000 bar. Average operating temperatures are from 220 to 300° C., but temperatures can be as high as 340° C.

A wide variety of initiators may be used with each type of reactor to initiate the free radical polymerization of ethylene. Initiators may include oxygen or one or more organic peroxides such as but not limited to di-tert-butylperoxide, cumyl peroxide, tert-butyl-peroxypivalate, tert-butyl hydroperoxide, benzoyl peroxide, tert-amyl peroxypivalate, tert-butyl-peroxy-2-ethylhexanoate, and decanoyl peroxide. Chain transfer reagents may also be used with each type of reactor to control the polymer melt index. Chain transfer reagents include but are not limited to propane, n-butane, n-hexane, cyclohexane, propylene, 1-butene, and isobutylene.

In embodiments of the disclosure, the LDPE has a density of from about 0.910 g/cm$^3$ to about 0.940 g/cm$^3$, including sub ranges within this range or any value within this range. For example, in embodiments of the disclosure, the LDPE has a density of from about 0.914 g/cm$^3$ to about 0.930 g/cm$^3$, or from about 0.916 g/cm$^3$ to about 0.930 g/cm$^3$, or from about 0.920 g/cm$^3$ to about 0.940 g/cm$^3$, or from about 0.920 g/cm$^3$ to about 0.930 g/cm$^3$.

In embodiments, the LDPE used in the present disclosure will have a melt index, $I_2$ of from 0.1 to 20.0 g/10 min, or from 0.1 to 15.0 g/10 min, or from 0.1 to 10.0 g/10 min.

In embodiments, the LDPE used in the present disclosure will have a melt index, $I_2$ of at least 1.0 g/10 min, or at least 2.0 g/10 min, or at least 2.5 g/10 min, or at least 3.0 g/10 min.

In embodiments, the LDPE used in the present disclosure will have a melt index, $I_2$ of from 1.0 to 10.0 g/10 min, or from 1.5 to 10.0 g/10 min, or from 2.0 to 10 g/10 min, or from 2.5 to 10.0 g/10 min, or from 3.0 to 10.0 g/10 min, or from 3.5 to 10.0 g/10 min, or from 4.0 to 10.0 g/10 min, or from 2.5 to 9.0 g/10 min, or from 2.5 to 8.5 g/10 min, or from 2.5 to 8.0 g/10 min, or from 3.0 to 9.0 g/10 min, or from 3.0 to 8.5 g/10 min, or from 3.0 to 8.0 g/10 min, or from 3.5 to 9.0 g/10 min, or from 3.5 to 8.5 g/10 min, or from 3.5 to 8.0 g/10 min, or from 4.0 to 9.0 g/10 min, or from 4.0 to 8.5 g/10 min or from 4.0 to 8.0 g/10 min.

In embodiments, the LDPE used in the present disclosure will have a melt index, $I_2$ of below 1.0 g/10 min. Such a LDPE may be referred to as a "frac melt" LDPE material. In further embodiments, the LDPE used in the present disclosure will have a melt index, 12 of from 0.01 to 1.0 g/10 min, or from 0.01 to below 1.0 g/10 min.

In embodiments of the disclosure, a high pressure low density polyethylene (LDPE) is a blend of LDPE materials having different densities and/or different melt indices, $I_2$'s.

In an embodiment, low density polyethylene LDPE, is a blend of LDPE made in a tubular reactor and LDPE made in an autoclave reactor.

In an embodiment, a LDPE polymer blend is prepared by physically blending different high pressure LDPEs (e.g. a LDPE produced in a tubular reactor with the LDPE produced in an autoclave reactor). Physically blending is meant to encompass those processes in which two or more individual ethylene homopolymers are mixed after they are removed from a polymerization reaction zone. Physically blending of the individual LDPEs may be accomplished by dry blending (e.g. tumble blending), extrusion blending (co-extrusion), solution blending, melt blending or any other similar blending technique known to those skilled in the art.

Polydispersity, $M_w/M_n$ also known as molecular weight distribution (MWD), is defined as the weight average molecular weight, $M_w$, divided by the number average molecular weight, $M_n$. The MWD of LDPE may in embodiments the disclosure be determined by gel permeation chromatography (GPC)-viscometry. The GPC-viscometry technique was based on the method of ASTM D6474-99 and uses a dual refractometer/viscometer detector system to analyze polymer samples. This approach allows for the online determination of intrinsic viscosities and is well known to those skilled in the art.

In embodiments of the disclosure, the LDPE has a MWD of greater than about 5.0. In embodiments of the disclosure, the LDPE has a MWD of from about 8.0 to about 30.0.

The molecular weight of the of the LDPE or blends thereof can further be described as unimodal, bimodal or multimodal. By using the term "unimodal", it is meant that the molecular weight distribution, can be said to have only one maximum in a molecular weight distribution curve. A molecular weight distribution curve can be generated according to the method of ASTM D6474-99. By using the term "bimodal", it is meant that the molecular weight distribution, can be said to have two maxima in a molecular weight distribution curve. The term "multi-modal" denotes the presence of more than two maxima in such a curve.

In embodiments of the disclosure, the LDPE used has a unimodal, bimodal or multimodal molecular weight distributions.

In an embodiment of the disclosure, the LDPE used is made in a tubular reactor and has a multimodal molecular weight distribution.

In embodiments of the disclosure, the LDPE used is made in an autoclave reactor and has a bimodal or multimodal molecular weight distribution.

In an embodiment of the disclosure, a blend of LDPEs is used and the blend has a multimodal molecular weight distribution.

Antioxidants packages for stabilizing LDPE in embodiments of the disclosure are well known in the art and may include a phenolic and a phosphite compound. Two non-limiting examples of a phenolic and phosphite stabilizer which may be added to a LDPE in embodiments of the disclosure are sold under the trade names IRGANOX® 1076 and IRGAFOS® 168 respectively. The phenolic compound is sometimes referred to as the "primary" antioxidant. The phosphite compound is sometimes referred to as the "secondary" antioxidant.

In embodiments of the disclosure, the levels of antioxidant present in a LDPE are from 0 to 2,000 parts per million, ppm, by weight (based on the weight of the LDPE). In further embodiments, the amounts of antioxidant present in a LDPE are from 0 to 1000 ppm, or from 0 to 500 ppm, or from 0 to 300 ppm, by weight (based on the weight of the LDPE).

In embodiments of the disclosure, the LDPE may be used in the form of powders, pellets, granules, or in any other extrudable form.

In the present disclosure, the amount of LDPE used as a polymer processing aid is relatively low relative to the weight of the bulk thermoplastic polyolefin material (e.g. the linear polyethylene). Accordingly, in embodiments of the disclosure, the LDPE is used in an amount which makes up from 1.0 to 25.0 weight percent of the total weight of the LDPE and the bulk thermoplastic polyolefin (e.g. a linear polyolefin), including sub ranges within this range and any value within this range. For example, in embodiments of the disclosure, the amount of LDPE will make up from 1.0 to 20.0 weight percent, or from 3.0 to 20.0 weight percent, or from 5.0 to 20.0 weight percent, or from 5.0 to 15.0 weight percent, or from 5.0 to 12.5 weight percent, or from 7.5 to 12.5 weight percent, or from 7.5 to 15.0 weight percent, or from 7.5 to 20.0 weight percent, or from 3.0 to 17.5 weight percent, or from 3.0 to 15.0 weight percent, or from 3.0 to 12.5 weight percent, or from 2.5 to 20.0 weight percent, or from 2.5 to 15.0 weight percent, or from 2.5 to 12.5 weight percent, or from greater than 0 to 20.0 weight percent, or from greater than 0 to 15.0 weight percent of from greater than 0 to 12.5 weight percent, of the total weight of the LDPE and the thermoplastic polyolefin (e.g. the linear polyethylene).

The Thermoplastic Polyolefin (E.g. A Linear Polyethylene)

The disclosure is useful for extrudable thermoplastic polyolefins in general but in an embodiment, the disclosure is particularly well suited for improving the extrusion of linear polyethylenes.

In an embodiment of the present disclosure, an extrudable or extruded thermoplastic composition (an "extrudate") comprises a linear polyethylene; at least one polyalkylene glycol, such as a polyethylene glycol; and LDPE, but is substantially free of fluoroelastomers, fluoropolymers, and other perfluorinated alkane derivatives.

In an alternative embodiment of the present disclosure, an extrudable or extruded thermoplastic composition (an "extrudate") comprises a linear polyethylene; a first polyethylene glycol having a weight average molecular weight, $M_w$, of from 2,000 to 10,000 g/mol; a second polyethylene glycol having a weight average molecular weight, $M_w$, of from 15,000 to 50,000 g/mol, but is substantially free of fluoroelastomers, fluoropolymers, and other perfluorinated alkane derivatives.

By "substantially free" it is meant that fluoroelastomers, fluoropolymers, and other perfluorinated alkane derivatives will be present in amounts below that which can improve the melt defect (e.g. melt fracture) performance of a thermoplastic composition during a melt extrusion process. In embodiments of the disclosure, fluoroelastomers, fluoropolymers, and other perfluorinated alkane derivatives, will be less than about 1 percent by weight, or less than about 0.5 percent by weight, or less than 0.1 percent by weight, or less than 500 parts per million, or less than 100 ppm, or less than 90 ppm, or less than 75 ppm, or less than 50 ppm, or less than 25 ppm, or less than 10 ppm, or about 0 weight percent, or about 0 ppm, of an extrudable or extruded thermoplastic composition.

In an embodiment of the present disclosure, a major or predominant component in an extrudable or extruded thermoplastic composition (an "extrudate") will be a linear polyethylene. In embodiments, such an "extrudate" will comprise a linear polyethylene in an amount of at least about 70% by weight, or at least about 75% by weight, or at least about 80% by weight, or at least about 85% by weight, of the extrudate composition.

The extrudable or extruded thermoplastic composition (an "extrudate") may, in embodiments of the disclosure, comprise a mixture of more than one different type of linear polyethylene.

A linear polyethylene is distinct from a high pressure low density polyethylene, LDPE, which (by virtue of the presence of large amounts of long chain branching) has a branched polymer microstructure and is made in a high pressure free radical polymerization process. Linear polyethylene is made using transition metal based olefin polymerization catalysts and has a linear polymer microstructure.

Olefin polymerization catalysts for use in the preparation of linear polyethylene are well known in the art: linear polyethylene can be made using so called single site polymerization catalysts, or multi-site polymerization catalysts. Multi-site polymerization catalysts, such as Ziegler-Natta catalysts and Phillips (chromium based) catalysts are well known by persons skilled in the art. Single site catalysts, such as metallocene catalysts, constrained geometry catalysts, phosphinimine catalysts, and catalysts having tetradentate ligands, are also well known by persons skilled in the art.

Linear polyethylenes include homogeneously branched linear ethylene polymers such as those described in U.S. Pat. No. 3,645,992; heterogeneously branched linear ethylene polymers such as those described in U.S. Pat. No. 4,076,698; and homogeneously branched linear ethylene polymers containing long chain branching (but less long chain branching than a LDPE), sometimes referred to as "substantially linear ethylene polymers" which are described in U.S. Pat. Nos. 5,272,236, 5,278,272, 5,582,923, and 5,733,155; and/or blends thereof.

The term "homogeneously branched" refers to linear ethylene copolymers in which the α-olefin comonomer is randomly distributed within the copolymer molecule, substantially all of the copolymer molecules have the same ethylene-to-α-olefin monomer ratio, and the ethylene copolymer is characterized by a relatively narrow short chain branching distribution as indicated by, for example, a composition distribution index, $CDBI_{50}$ of greater than about 50 percent by weight, or in some embodiments greater than about 75 percent by weight, or greater than about 80 percent by weight, or greater than about 90 percent by weight. Homogeneously branched ethylene copolymers are generally prepared using single site olefin polymerization catalysts.

The term "heterogeneously branched" is used herein to refer to linear ethylene copolymers characterized by a relatively broad short chain branching distribution as indicated by, for example, a composition distribution index, $CDBI_{50}$ of less than about 75 percent by weight, or in some embodiments less than about 50 percent by weight. Heterogeneously branched ethylene copolymers are generally prepared using multi-site olefin polymerization catalysts.

In embodiments of the disclosure, a linear polyethylene will be selected from ethylene homopolymers and copolymers comprising polymerized units having the general formula $CH_2$=$CHR^3$, wherein $R^3$ is a hydrogen or an alkyl group. In embodiments of the disclosure, $R^3$ is a hydrocarbon group having up to 10 carbon atoms. In other embodiments of the disclosure, $R^3$ is a hydrocarbon group having from one to six carbon atoms, and may for example be an aromatic group such as a phenyl group (i.e. styrene as alpha olefin), or a n-hexyl group (i.e. 1-octene as alpha olefin).

In embodiments of the disclosure, a linear polyethylene is an ethylene homopolymer or an ethylene copolymer.

In embodiments of the disclosure, an ethylene copolymer comprises polymerized ethylene and one or more than one polymerized alpha olefin selected from the group comprising $C_3$-$C_{12}$ alpha olefins.

In embodiments of the disclosure, an ethylene copolymer comprises polymerized ethylene and one or more than one polymerized alpha olefin selected from the group comprising $C_3$-$C_{12}$ alpha olefins, and polymerized ethylene comprises at least 85 weight percent of the ethylene copolymer.

In embodiments of the disclosure, an ethylene copolymer comprises polymerized ethylene and one or more than one polymerized alpha olefin selected from the group comprising $C_3$-$C_{12}$ alpha olefins, and polymerized ethylene comprises at least 90 weight percent of the ethylene copolymer.

In embodiments of the disclosure, an ethylene copolymer comprises polymerized ethylene and one or more than one polymerized alpha olefin selected from the group comprising propylene, 1-butene, 1-hexene, 1-octene, 1-decene, 4-methyl-1-pentene, and 1-octadecene.

In embodiments of the disclosure, an ethylene copolymer comprises polymerized ethylene and one or more than one polymerized alpha olefin selected from the group comprising 1-butene, 1-hexene, and 1-octene.

In embodiments of the disclosure, an ethylene copolymer comprises polymerized ethylene and one or more than one alpha olefin selected from the group comprising 1-butene, 1-hexene, and 1-octene, and polymerized ethylene comprises at least 85 weight percent of the ethylene copolymer.

In embodiments of the disclosure, an ethylene copolymer comprises polymerized ethylene and one or more than one polymerized alpha olefin selected from the group comprising 1-butene, 1-hexene, and 1-octene, and polymerized ethylene comprises at least 90 weight percent of the ethylene copolymer.

The linear polyethylene may be prepared by using one or more olefin polymerization catalysts in any conventionally known processes, such as gas phase polymerization, slurry phase polymerization or solution phase polymerization.

In a gas phase polymerization process, a transition metal polymerization catalyst may be immobilized on a suitable support material, and the resulting particulate catalyst may be employed in a fluidized bed polymerization process. In general, a fluidized bed gas phase polymerization reactor employs a "bed" of polymer and catalyst particles which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

In embodiments, the reactor pressure in a gas phase process may vary from about atmospheric to about 600 Psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

In a slurry phase polymerization process, a transition metal polymerization catalyst may be immobilized on a suitable support material, and the resulting particulate catalyst may be employed in a slurry phase polymerization process. Slurry phase polymerization processes are conducted in the presence of a hydrocarbon diluent such as an alkane (including for example isoalkanes), an aromatic or a cycloalkane. The diluent may also be the alpha olefin comonomer used in copolymerizations. Some non-limiting alkane diluents include propane, butanes, (i.e. normal butane and/or isobutane), pentanes, hexanes, heptanes and octanes. The monomers may be soluble in (or miscible with) the diluent, but the polymer is not (under polymerization conditions). In embodiments, the polymerization temperature is from about 5° C. to about 200° C., or less than about 120° C., or from about 10° C. to about 100° C. The reaction temperature is selected so that an ethylene or alpha olefin homopolymer or copolymer is produced in the form of solid particles. The reaction pressure is influenced by the choice of diluent and reaction temperature. For example, in embodiments, the pressures may range from 15 to 45 atmospheres (about 220 to 660 psi or about 1500 to about 4600 kPa) when isobutane is used as diluent to approximately twice that (i.e. from 30 to 90 atmospheres—about 440 to 1300 psi or about 3000-9100 kPa) when propane is used. The pressure in a slurry process must be kept sufficiently high to keep at least part of the ethylene and/or alpha olefin to be polymerized in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

Solution polymerization processes for the polymerization or copolymerization of olefins such as ethylene and alpha olefins are well known in the art. Solution processes are generally conducted in the presence of an inert hydrocarbon solvent in which the resultant polyolefin is soluble under the polymerization conditions employed. In an embodiment of the disclosure the solvent used in a solution phase polymerization process is selected from the group consisting of $C_{5-12}$ hydrocarbons which may be unsubstituted or substituted by $C_{1-4}$ alkyl group, and include hydrocarbon solvents such as pentane, methyl pentane, hexane, heptane, octane, cyclohexane, methylcyclohexane and hydrogenated naphtha. Another example of a suitable solvent for use in embodiments of the present disclosure and which is commercially available is "Isopar E" ($C_{8-12}$ aliphatic solvent, Exxon Chemical Co.). The polymerization temperature in a conventional solution process may be from about 80° C. to about 300° C. In an embodiment of the disclosure the polymerization temperature in a solution process is from about 120° C. to about 250° C. The polymerization pressure in a solution process may be a "medium pressure process", meaning that the pressure in the reactor is less than about 6,000 psi (about 42,000 kiloPascals or kPa). In an embodiment of the disclosure, the polymerization pressure in a solution process may be from about 10,000 to about 40,000 kPa, or from about 14,000 to about 22,000 kPa (i.e. from about 2,000 psi to about 3,000 psi).

In solution polymerization, the monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) may be treated in a similar manner.

The feedstock may be heated or cooled prior to feeding to the reactor.

Generally, the olefin polymerization catalyst components (e.g. the olefin polymerization catalyst molecule, an ionic activator and optionally an alkylaluminoxane) may be pre-mixed in the solvent for the reaction or fed as separate streams to a solution phase polymerization reactor. In some instances, premixing may be desirable to provide a reaction time for the catalyst components prior to entering the reaction. Such an "in line mixing" technique is described in a U.S. Pat. No. 5,589,555.

Solution phase polymerization processes can be carried out in one or more stirred tank reactors (e.g. a continuously stirred tank reactor), loop reactors or the like, and these reactors can be configured in series or in parallel with one another.

Examples of well-known linear polyethylenes, employed in embodiments of the present disclosure include, linear low density polyethylene (LLDPE), medium density polyethylene (MDPE), high density polyethylene (HDPE), and very low density polyethylene (VLDPE).

In the present disclosure, a high density polyethylene (HDPE) is an ethylene homopolymer or an ethylene copolymer with another alpha olefin (such as, for example, 1-butene, 1-hexene, and/or 1-octene) and has a density of about 0.949 g/cm³ or greater. In embodiments, a HDPE is an ethylene homopolymer or an ethylene copolymer with another alpha olefin (such as, for example, 1-butene, 1-hexene, and/or 1-octene) having a density of at least 0.950 g/cm³, or at least 0.951 g/cm³, or at least 0.952 g/cm³, or at least 0.953 g/cm³. In embodiments, a HDPE is an ethylene homopolymer or an ethylene copolymer with another alpha olefin (such as, for example, 1-butene, 1-hexene, and/or 1-octene) having a density of from about 0.950 g/cm³ to about 0.970 g/cm³, or from about 0.950 g/cm³ to about 0.965 g/cm³.

In the present disclosure, linear low density polyethylene (LLDPE) is an ethylene copolymer with another alpha olefin (such as, for example, 1-butene, 1-hexene, and/or 1-octene) and has a density of from about 0.910 g/cm³ to about 0.940 g/cm³ including subranges within this range or any value within this range. In embodiments of the disclosure a LLDPE has a density of from 0.910 to 0.936 g/cm³, or from 0.912 to 0.936 g/cm³, or from 0.910 to 0.932 g/cm³, or from 0.912 to 0.932 g/cm³.

In the present disclosure, medium density polyethylene (MDPE) is an ethylene copolymer with another alpha olefin (such as, for example, 1-butene, 1-hexene, and/or 1-octene) and has a density of from about 0.940 g/cm³ to about 0.949 g/cm³ including subranges within this range or any value within this range.

In the present disclosure, very low density polyethylene is an ethylene copolymer with another alpha olefin (such as propylene, 1-butene, 4-methyl-1-pentene, 1-hexene, and/or 1-octene) and has a density of less than about 0.910 g/cm³ and may include so called elastomers and plastomers. In embodiments, a VLDPE is an ethylene copolymer with another alpha olefin (such as, for example, propylene, 1-butene, 4-methyl-1-pentene 1-hexene, and/or 1-octene) having a density of from about 0.880 g/cm³ to about 0.910 g/cm³, or from about 0.880 g/cm³ to about 0.905 g/cm³, or from about 0.880 g/cm³ to about 0.902 g/cm³.

In embodiments of the disclosure, a linear polyethylene has a density of from 0.900 to 0.955 g/cm³, or from 0.900 to 0.950 g/cm³.

In an embodiment of the disclosure, a linear polyethylene is selected from the group consisting of linear low density polyethylene (LLDPE), medium density polyethylene (MDPE), high density polyethylene (HDPE), very low density polyethylene (VLDPE) and mixtures thereof.

Depending on the types of polymerization process and olefin polymerization catalyst used, in embodiments of the disclosure, the linear polyethylene may have a weight average molecular weight, $M_w$, of at least about 10,000 g/mol, and up to about 1,500,000 g/mol including any sub range within this range or any value within this range. For example, in further embodiments, the linear polyethylene has a weight average molecular weight, Mw, of from about 50,000 to about 1,000,000 g/mol, or from about 100,000 to about 1,000,000 g/mol, or from about 75,000 to about 750,000 g/mol, or from about 100,000 to about 750,000 g/mol, or from about 75,000 to about 500,000 g/mol, or from about 100,000 to about 500,000 g/mol, or from about 50,000 to about 350.00 g/mol, or from about 75,000 to about 350,000 g/mol, or from about 100,000 to about 350,000 g/mol, or from about 50,000 to about 300,000 g/mol, or from about 75,000 to about 300,000 g/mol, or from about 100,000 to about 300,000 g/mol, or from about 50,000 to about 250,000 g/mol, or from about 75,000 to about 250,000 g/mol, or from about 100,000 to about 250,000 g/mol.

In embodiments of the disclosure, the linear polyethylene has a molecular weight distribution, $M_w/M_n$ of from about 2.0 to about 12.0, including sub ranges within this range or any value within this range. For example, in embodiments of the disclosure, the linear polyethylene has a $M_w/M_n$ value of from about 2.0 to about 10.0, or from about 2.0 to about 8.0, or from about 2.0 to about 5.0.

In embodiments of the disclosure, a linear polyethylene is characterized by its melt index, $I_2$, as determined by ASTM D1238, Condition E, at 190° C. In embodiments of the disclosure, a linear polyethylene has a melt index, $I_2$ of from 0.1 to 20.0 g/10 min, including any sub range within this range or any value within this range. For example, in embodiments of the disclosure, a linear polyethylene has a melt index, $I_2$ of from 0.1 to 15.0 g/10 min, or from 0.1 to 10.0 g/10 min, or from 0.3 to 15.0 g/10 min, or from 0.3 to 10.0 g/10 min, or from 0.1 to 5.0 g/10 min or from 0.3 to 5.0 g/10 min, or from 0.5 to 15.0 g/10 min, or from 0.5 to 10.0 g/10 min, or from 0.5 to 5.0 g/10 min.

In embodiments of the disclosure, a linear polyethylene selected from the group consisting of LLDPE, MDPE, HDPE, VLPDE and mixtures thereof, may be used in the form of powders, pellets, granules, or in any other extrudable form.

In embodiments of the disclosure, a linear polyethylene is a LLDPE.

In embodiments of the disclosure, a linear polyethylene is a LLDPE having a melt index, $I_2$ of from 0.1 to 10.0 g/10 min, or from 0.5 to 5.0 g/10 min.

In an embodiment of the disclosure, a linear polyethylene is a LLDPE having a density of from about 0.910 g/cm³ to about 0.936 g/cm³ and a melt index, $I_2$ of from 0.1 to 10.0 g/10 min.

In embodiments of the disclosure, a linear polyethylene is a LLDPE having a density of from about 0.910 g/cm³ to about 0.936 g/cm³ and a melt index, $I_2$ of from 0.1 to 5.0 g/10 min.

In embodiments of the disclosure, a linear polyethylene is a LLDPE having a molecular weight distribution, $M_w/M_n$ of from about 2.0 to about 12.0, including sub ranges within this range or any value within this range. For example, in embodiments of the disclosure, a LLDPE has a $M_w/M_n$ value of from about 2.0 to about 10.0, or from about 2.0 to about 8.0, or from about 2.0 to about 5.0.

In some embodiments of the disclosure, a linear polyethylene will comprise small amounts, defined as <3.0 weight percent (wt %, based on the total weight of the linear polymer and the LDPE) of a high pressure low density polyethylene, LDPE having a melt index of below about 1.0 g/10 min. In some embodiments of the disclosure, a homogeneously branched linear polyethylene will comprise small amounts, defined as <3.0 weight percent (wt %, based on the total weight of the linear polymer and the LDPE), of a high pressure low density polyethylene, LDPE having a melt index of below about 1.0 g/10 min. Without wishing to be bound by theory, the presence of small amounts of a LDPE having a melt index of below about 1.0 g/10 min may be useful in various end use applications.

The present disclosure is directed to the extrusion of thermoplastic compositions in a wide variety of extrusion processes such as profile extrusion in which an extruded part such as a pipe or profiled part is prepared by extruding molten plastic through a shaped die) and film extrusion (in which plastic film is prepared by extruding molten plastic through a slit or annular die).

In an embodiment of the disclosure, a film extrusion process is, such as for example, a "blown film" extrusion process is employed. Such a blown film extrusion process is described in more detail below in the Examples section.

For film applications, in an embodiment of the disclosure, it is preferable that no pigment or filler is added to the polyolefin (e.g. the linear polyethylene) in order to produce extruded film which clear or relatively clear. In other applications such as wire and cable (electrical or optical), in an embodiment of the disclosure, the polyolefin (e.g. linear polyethylene) may contain a pigment/filler such as carbon black and other adjuvants.

The thermoplastic polyolefin, such as a linear polyethylene, used in the present disclosure may further include fillers, antioxidants (such as a primary and optionally a secondary antioxidant), pigments, opacifying agents, static control agents such as glycerol monostearate, lubricants such as fatty acid esters, light stabilizers (such as hindered amine light stabilizers), zinc oxide, antiblock agents and other adjuvants. Some care must be taken when using antiblock agents (such as silica or talc) and/or hindered amine light stabilizers as these may have an adverse effect upon the surface appearance of an extrudate composition comprising a polyolefin, as is known to persons skilled in the art.

In embodiments of the disclosure, an antioxidant (a primary antioxidant alone or optionally a primary antioxidant in combination with a secondary antioxidant) is added to a polyolefin (e.g. a linear polyethylene) and is added in an amount from about 0.01 to about 2 weight percent, or from about 0.01 to about 1 weight percent.

In an embodiment a linear polyethylene comprises a primary antioxidant, and a secondary antioxidant.

In an embodiment a linear polyethylene comprises a hindered phenol primary antioxidant, and a phosphorus-containing secondary antioxidant.

Further description of additives which may in embodiments be added to a thermoplastic polyolefin, such as a linear polyethylene are provided below, including: primary antioxidants; secondary antioxidants; UV absorbers and light stabilizers; polyamide stabilizers; basic co-stabilizers; nucleating agents; slip agents; fillers, antiblocking agents, and reinforcing agents, and various further miscellaneous additives.

In embodiments of the disclosure, the additives added to a thermoplastic polyolefin (e.g. a linear polyethylene) may be used in an amount of from 100 to 5,000 ppm, or from 100 to 3,000 ppm, or from 200 to 3,000 ppm, or from 200 to 2,000 ppm, or from 300 to 1,500 ppm, or from 400 to 1,200 ppm (based on the weight of the thermoplastic polyolefin).

Primary Antioxidants

In embodiments of the disclosure, a primary antioxidant is selected from alkylated mono-phenols (also described herein as "hindered phenol primary antioxidants") such as, for example: 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(alpha.-methylcyclohexyl)-4,6 dimethylphenol; 2,6-di-octadecyl-4-methylphenol; 2,4,6, -tricyclohexyphenol; and 2,6-di-tert-butyl-4-methoxymethylphenol. Suitable hindered phenolic antioxidants which can be used in embodiments of the disclosure, are sold under the trademarks IRGANOX® 1010 (CAS Registry number 6683-19-8) and IRGANOX 1076 (CAS Registry number 2082-79-3) by BASF Corporation.

In embodiments of the disclosure, a primary antioxidant is selected from alkylated hydroquinones. such as for example: 2,6-di-tert-butyl-4-methoxyphenol; 2,5-di-tertbutylhydroquinone; 2,5-di-tert-amyl-hydroquinone; and 2,6-diphenyl-4-octadecyloxyphenol.

In embodiments of the disclosure, a primary antioxidant is selected from hydroxylated thiodiphenyl ethers, such as, for example: 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

In embodiments of the disclosure, a primary antioxidant is selected from alkylidene-bisphenols, such as, for example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl)phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonyl-phenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenyl) butane 2,6-di-(3-tert-butyl-5-methyl-2-hydroxybenzyl)-4-methylphenol; 1,1,3-tris-(5-tert-butyl-4-hydroxy-2-methylphenyl) butane; 1,1-bis-(5-tert-butyl-4-hydroxy2-methylphenyl)-3-dodecyl-mercaptobutane; ethyleneglycol-bis-(3,3, -bis-(3'-tert-butyl-4'-hydroxyphenyl)-butyrate)-di-(3-tert-butyl-4-hydroxy-5-methylphenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidene bis-2,4-di-t-butylphenol monoacrylate ester.

In embodiments of the disclosure, a primary antioxidant is selected from benzyl compounds, such as for example, 1,3,5-tris-(3,5-di-tert-butyl-4-hydroxybenzyl)-2,4,6-trimethylbenzene; bis-(3,5-di-tert-butyl-4-hydroxybenzyl) sulfide; isooctyl 3,5-di-tert-butyl-4-hydroxybenzyl-mercaptoacetate; bis-(4-tert-butyl-3hydroxy-2,6-dimethylbenzyl) dithiol-terephthalate; 1,3,5-tris-(3,5-di-tert-butyl-4,10-hydroxybenzyl) isocyanurate; 1,3,5-tris-(4-tert-butyl-3-hydroxy-2,6-dimethylbenzyl) isocyanurate; dioctadecyl 3,5-di-tert-butyl-4-hydroxybenzylphosphonate; calcium salt of monoethyl 3,5-di-tertbutyl-4-hydroxybenzylphosphonate; and 1,3,5-tris-(3,5-dicyclohexyl-4-hydroxybenzyl) isocyanurate.

In embodiments of the disclosure, a primary antioxidant is selected from acylaminophenols, such as, for example, 4-hydroxy-lauric acid anilide; 4-hydroxy-stearic acid anilide; 2,4-bis-octylmercapto-6-(3,5-tert-butyl-4-hydroxyanilino)-s-triazine; and octyl-N-(3,5-di-tert-butyl-4-hydroxyphenyl)-carbamate.

In embodiments of the disclosure, a primary antioxidant is selected from esters of beta-(5-tert-butyl-4-hydroxy-3-methylphenyl)-propionic acid with monohydric or polyhydric alcohols, such as for example, methanol; diethyleneglycol; octadecanol; triethyleneglycol; 1,6-hexanediol; pentaerythritol; neopentylglycol; tris-hydroxyethyl isocyanurate; thidiethyleneglycol; and dihydroxyethyl oxalic acid diamide.

In embodiments of the disclosure, a primary antioxidant is selected from amides of beta-(3,5-di-tert-butyl-4-hydroxyphenol)-propionic acid, such as for example, N,N'-di-(3,5-di-tert-butyl-4-hydroxyphenylpropionyl)-hexamethylenediamine; N,N'-di-(3,5-di-tert-butyl-4-hydroxyphenylpropionyl) trimethylenediamine; and N,N'-di (3,5-di-tert-butyl-4-hydroxyphenylpropionyl)-hydrazine.

In embodiments of the disclosure, the primary antioxidant may be used in an amount of from 100 to 5,000 ppm, or from 100 to 3,000 ppm, or from 200 to 3,000 ppm, or from 200 to 2,000 ppm, or from 300 to 1,500 ppm, or from 400 to 1,200 ppm (based on the weight of the thermoplastic polyolefin).

Secondary Antioxidants

In embodiments of the disclosure, a secondary antioxidant is selected from phosphites and phosphonites (also described herein as "phosphorus containing secondary antioxidants"), such as, for example, triphenyl phosphite; diphenylalkyl phosphites; phenyldialkyl phosphites; tris(nonyl-phenyl) phosphite [WESTON® 399, available from SI Group]; phosphorous acid, mixed 2,4-bis(1,1-dimethylpropyl)phenyl and 4-(1,1-dimethylpropyl)phenyl triesters [WESTON 705, CAS Reg. No. 939402-02-5, available from SI Group]; trilauryl phosphite; trioctadecyl phosphite; distearyl pentaerythritol diphosphite; tris(2,4-di-tert-butylphenyl)phosphite [IRGAFOS® 168, available from BASF]; diisodecyl pentaerythritol diphosphite; 2,4,6-tri-tert-butylphenyl-2-butyl-2-ethyl-1,3-propanediol phosphite; bis(2,4-di-tert-butyl-6-methylphenyl) ethyl phosphite [IRGAFOS 38, available from BASF]; 2,2',2"-nitrilo[triethyltris(3,3'5,5'-tetra-tert-butyl-1,1'-biphenyl-2,2'-diyl) phosphite [IRGAFOS 12, available from BASF]; bis(2,4-di-tert-butylphenyl) pentaerythritol diphosphite tristearyl sorbitol triphosphite; tetrakis(2,4-di-tert-butylphenyl) 4,4'-biphenylene diphosphonate; 6-[3-(3-tert-butyl-4-hydroxy-5-methylphenyl) propoxy]-2,4,8,10-tetra-tert-butyldibenzo[d,f][1,3,2] dioxaphospepin [SUMILIZER® GP]; bis(2,4,6-tri-tert-butylphenyl) pentaerythritol diphosphate; bis(2,4-dicumylphenyl) pentaerythritol diphosphate; distearyl pentaerythritol diphosphate; diisodecyl pentaerythritol diphosphate; bis(2,4 di-tert-butylphenyl) pentaerythritol diphosphite [ULTRANOX® 626, available from SI Group]; bis(2,6-di-tert-butyl-4-methylphenyl) pentaerythritol diphosphite; bisisodecyloxy-pentaerythritol diphosphite; bis (2,4-di-tert-butyl-6-methylphenyl) pentaerythritol diphosphite; bis(2,4,6-tri-tert-butylphenyl) pentaerythritol diphosphite; tetrakis(2,4-di-tert-butylphenyl) 4,4'-biphenylenediphosphonite [IRGAFOS P-EPQ, available from BASF]; bis(2,4-dicumylphenyl) pentaerythritol diphosphite [DOVERPHOS® S9228-T or DOVERPHOS S9228-CT] and PEPQ (CAS Reg. No. 119345-1-6) a commercially available diphosphonate; or a mixture thereof. In embodiments of the disclosure, a secondary antioxidant is selected from DOVERPHOS LGP-11, DOVERPHOS LGP-12 and DOVERPHOS LGP-12LV.

In embodiments of the disclosure, a secondary antioxidant is selected from alkylphenol free, polymeric polyphosphites, examples of which are disclosed in U.S. Pat. No. 8,563,637.

In embodiments of the disclosure, a secondary antioxidant is selected from peroxide scavengers, such as, for example, esters of betathiodipropionic acid. Esters betathiodipropionic acid may be selected from the group consisting of lauryl, stearyl, myristyl or tridecyl esters. Other peroxide scavengers for use as a secondary antioxidant in certain embodiments may be selected from the group consisting of mercaptobenzimidazole; or the zinc salt of 2-mercaptobenzimidazole; zinc-dibutyidithiocarbamate; dioctadecyidisulfide; and pentaerythritottetrakis-(beta-dodecylmercapto)-propionate.

In embodiments of the disclosure, a secondary antioxidant is selected from hydroxylamines and amine oxides, such as, for example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamine; N-heptadecyl-N-octadecylhydroxylamine; and N,N-dialkylhydroxylamine derived from hydrogenated tallow amine. The analogous amine oxides are also suitable. A commercially available example of hydroxylamine which may be used in embodiments of the disclosure is the N,N-di(alkyl) hydroxylamine sold as IRGASTAB® 042 (by BASF) and which is reported to be prepared by the direct oxidation of N,N-di(hydrogenated) tallow amine.

In embodiments of the disclosure, a secondary antioxidant is selected from nitrones, such as, for example, N-benzyl-alpha-phenyl nitrone; N-ethyl-alpha-methyl nitrone; N-octyl-alpha-heptyl nitrone; N-lauryl-alpha-undecyl nitrone; N-tetradecyl-alpha-tridecyl nitrone; N-hexadecyl-alpha-pentadecyl nitrone; N-octadecyl-alpha-heptadecylnitrone; N-hexadecyl-alpha-heptadecyl nitrone; N-octadecyl-alpha-pentadecyl nitrone; N-heptadecyl-alpha-heptadecyl nitrone; N-octadecyl-alpha-hexadecyl nitrone; and nitrone derived from N, N-dialkylhydroxylamine derived from hydrogenated tallow amine.

In embodiments of the disclosure, the secondary antioxidant may also be used in an amount of from 100 to 5,000 ppm, or from 100 to 3,000 ppm, or from 200 to 3,000 ppm, or from 200 to 2,000 ppm, or from 300 to 1,500 ppm, or from 400 to 1,200 ppm (based on the weight of the thermoplastic polyolefin).

UV Absorbers and Light Stabilizers

In embodiments of the disclosure, a UV absorber or light stabilizer is selected from 2-(2'-hydroxyphenyl)-benzotriazoles, such as, for example, the 5'-methyl-; 3',5'-di-tert-butyl-; 5'-tert-butyl-; 5' (1,1,3,3-tetramethylbutyl)-; 5-chloro-3',5'-di-tert-butyl-; 5-chloro-3'-tert-butyl-5'-methyl-; 3'-sec-butyl-5'-tert-butyl-; 4'-octoxy,3',5'-di-tert-amyl-; and 3',5'-bis-(alpha, alpha-dimethylbenzyl) derivatives.

In embodiments of the disclosure, a UV absorber or light stabilizer is selected from 2-hydroxy-benzophenones, such as, for example, the 4-hydroxy-; 4-methoxy-; 4-octoxy; 4-decyloxy-; 4-dodecyloxy-; 4-benzyloxy-; 4,2',4'-trihydroxy-; and 2'-hydroxy-4,4'-dimethoxy derivative.

In embodiments of the disclosure, a UV absorber or light stabilizer is selected from sterically hindered amines, such as, for example, bis(2,2,6,6-tetramethylpiperidyl)-sebacate; bis-5 (1,2,2,6,6-pentamethylpiperidyl)-sebacate; n-butyl-3, 5-di-tert-butyl-4-hydroxybenzyl malonic acid bis(1,2,2,6,6,-pentamethylpiperidyl) ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylenediamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4-butane-tetra-arbonic acid; and 1,1' (1,2-ethanediyl)-bis-(3,3,5,5-tetramethylpiperazinone). These amines are typically called HALS (Hindered Amines Lights Stabilizing) and include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2, 2,6,6-tetramethyl-piperidin-4-yl)-epsiloncaprolactam. Suitable commercially available HALS which may be used in embodiments of the disclosure include those sold under the trademarks CHIMASSORB® 119; CHIMASSORB 944; CHIMASSORB 2020; TINUVIN® 622 and TINUVIN 770 from BASF, and CYASORB® UV 3346, CYASORB UV 3529, CYASORB UV 4801, and CYASORB UV 4802 from Solvay. In other embodiments of the disclosure, the use of mixtures of more than one HALS are also contemplated In embodiments of the disclosure, a UV absorber or light stabilizer is selected from esters of substituted and unsubstituted benzoic acids, such as for example, phenyl salicilate; 4-tertbutylphenyl-salicilate; octylphenyl salicylate; dibenzoylresorcinol; bis-(4-tert-butylbenzoyl)-resorcinol; benzoyl-resorcinol; 2,4-di-tert-butyl-phenyl-3,5-di-tert-butyl-4-hydroxybenzoate; and hexadecyl-3,5-di-tert-butyl-4-hydroxybenzoate.

In embodiments of the disclosure, a UV absorber or light stabilizer is selected from acrylates, such as, for example, alpha-cyano-beta, beta-diphenylacrylic acid-ethyl ester or isooctyl ester; alpha-carbomethoxy-cinnarnic acid methyl ester; alpha-cyano-beta-methyl-p-methoxy-cinnamic acid methyl ester or butyl ester; alpha-carbomethoxy-p-methoxy-cinnamic acid methyl ester; and N-(beta-carbomethoxy-beta-cyano-vinyl)-2-methyl-indoline.

In embodiments of the disclosure, a UV absorber or light stabilizer is selected from nickel compounds, such as, for example, nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyl-diethanolamine; nickel dibutyldithiocarbamate; nickel salts of 4-hydroxy-3,5-di-tert-butylbenzylphosphonic acid monoalkyl esters, such as of the methyl, ethyl, or butyl ester; nickel complexes of ketoximes such as of 2-hydroxy-4-methyl-penyl undecyl ketoxime; and nickel complexes of 1-phenyl-4-lauroyl-5-hydroxy-pyrazole, optionally with additional ligands.

In embodiments of the disclosure, a UV absorber or light stabilizer is selected from oxalic acid diamides, such as, for example, 4,4'-di-octyloxy-oxanilide; 2,2'-di-octyloxy-5',5'-ditert-butyloxanilide; 2,2'-di-dodecyloxy-5',5'di-tert-butyl-oxanilide; 2-ethoxy-2'-ethyl-oxanilide; N,N'-bis(3-dimethylaminopropyl)-oxalamide; 2-ethoxy-5-tert-butyl-2'-ethyloxanilide and its mixture with 2-ethoxy-2'-ethyl-5,4-di-tert-butyloxanilide; and mixtures of ortho- and para-methoxy as well as of o- and p-ethoxy-disubstituted oxanilides.

In embodiments of the disclosure, a UV absorber or light stabilizer is selected from hydroxyphenyl-s-triazines, such as, for example, 2,6-bis-(2,4-dimethylphenyl)-4-(2-hydroxy-4octyloxyphenyl)-s-triazine; 2,6-bis(2,4-dimethylphenyl)-4-(2,4-dihydroxyphenyl)-s-triazine; 5,2,4-bis(2, 4-dihydroxyphenyl)-6-(4-chlorophenyl)-s-triazine; 2,4-bis (2-hydroxy4-(2-hydroxyethoxy)phenyl)-6-(4-chlorophenyl)-s-triazine; 2,4-bis(2hydroxy4-(2-hydroxyethoxy)phenyl)-6-phenyl-s-triazine; 2,4-bis(2-hydroxy4-(2-hydroxyethoxy)-phenyl)-6-(2,4-dimethylphenyl)-s-tri azine; 2,4-bis(2-hydroxy4-(2-hydroxyethoxy)phenyl)-6-(4-bromo-phenyl)-s-triazine; 2,4-bis(2-hydroxy4-(2-acetoxyethoxy)phenyl)-6-(4-chlorophenyl)-s-triazine; and 2,4-bis(2,4-dihydroxyphenyl)-6-(2,4-dimethylphenyl)-1-s-triazine.

Polyamide Stabilizers

In embodiments of the disclosure, a polyamide stabilizer is selected from for example, copper salts in combination with iodides and/or phosphorus compounds and salts of divalent manganese.

Basic Co-Stabilizers

In embodiments of the disclosure, a basic co-stabilizer is selected from, for example, melamine; polyvinylpyrrolidone; dicyandiamide; triallyl cyanurate; urea derivatives; hydrazine derivatives; amines; polyamides; polyurethanes; alkali metal salts and alkaline earth metal salts of higher fatty acids, for example, Ca stearate, calcium stearoyl lactate, calcium lactate, Zn stearate, Mg stearate, Na ricinoleate and K palmitate; antimony pyrocatecholate or zinc pyrocatecholate, including neutralizers such as zinc oxide, hydrotalcites and synthetic hydrotalcites; and Li, Na, Mg, Ca, Al hydroxy carbonates.

In embodiments a hydrotalcite has the formula: $[M^{2+}_{1-x}M^{3+}_x(OH)_2]^{x+}[(A^{n-})_{x/n}\cdot mH_2O]^{x-}$ where $M^{2+}$ is divalent Mg, Ni, Zn, Cu, or Mn; $M^{3+}$ is trivalent Al, Fe, or Cr; $A^{n-}$ is an anion such as for examples, $CO_3^{2-}$, or $SO_4^{2-}$, $NO_3^{2-}$, $Cl^{1-}$, or $OH^{1-}$; and x is from 0.1 to 0.5. In an embodiment a hydrotalcite has the formula: $Mg_6Al_2(OH)_{16}CO_3 \cdot nH_2O$. In an embodiment a hydrotalcite is the mineral hydrotalcite ($Mg_6Al_2(OH)_{16}CO_3 \cdot 4H_2O$). Hydrotalcites which may be used in embodiments of the disclosure, include materials commercially available under the general tradenames DHT-4® (A, C, or V), ZHT-4V® HYCITE® 713, and AC-207™

Nucleating Agents

The term "nucleating agent", as used herein, is meant to convey its conventional meaning to those skilled in the art of preparing nucleated polyolefin compositions, namely an additive that changes the crystallization behavior of a polymer as the polymer melt is cooled.

A review of nucleating agents is provided in U.S. Pat. Nos. 5,981,636, 6,465,551 and 6,599,971, the disclosures of which are incorporated herein by reference.

Nucleating agents which are commercially available and which may be added to a thermoplastic polyolefin (e.g. a linear polyethylene) are dibenzylidene sorbital esters. Further examples of nucleating agents which may be added to thermoplastic polyolefins (e.g. a linear polyethylene) include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophthalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may be added to a thermoplastic polyolefin (e.g. a linear polyethylene) include those disclosed in WO2015042561, WO2015042563, WO2015042562 and WO2011050042.

In an embodiment of the disclosure, the amount of nucleating agent used is comparatively small—from 100 to 3000 parts by million per weight (based on the weight of the thermoplastic polyolefin) so it will be appreciated by those skilled in the art that some care should be taken to ensure that the nucleating agent is well dispersed. In an embodiment of the disclosure, the nucleating agent is added in finely divided form (less than 50 microns, especially less than 10 microns) to the thermoplastic polyolefin (e.g. a linear polyethylene) to facilitate mixing. This type of "physical blend" (i.e. a mixture of the nucleating agent and the resin in solid form) is in some embodiments preferable to the use of a "masterbatch" of the nucleator (where the term "masterbatch" refers to the practice of first melt mixing the additive—the nucleator, in this case—with a small amount of the thermoplastic polyolefin—then melt mixing the "masterbatch" with the remaining bulk of the thermoplastic polyolefin).

In an embodiment of the disclosure, an additive such as nucleating agent may be added to the thermoplastic polyolefin by way of a "masterbatch", where the term "masterbatch" refers to the practice of first melt mixing the additive (e.g. a nucleator) with a small amount of the thermoplastic polyolefin, followed by melt mixing the "masterbatch" with the remaining bulk of the thermoplastic polyolefin.

In embodiments, the nucleating agent, or mixture of nucleating agents is added in an amount of from 50 to 5,000 ppm, or from 100 to 4,000 ppm, or from 200 to 4,000 ppm, or from 100 to 3000 ppm, or from 200 to 3,000 ppm, or from 100 to 2,000 ppm, or from 200 to 2,000 ppm, or from or from 500 to 5,000 ppm, or from 500 to 4,000 ppm, or from 500 to 3,000 ppm, or from 500 to 2,000 ppm or from 500 to 1,500 ppm, based on the weight of the thermoplastic polyolefin.

Slip Agents

In embodiments of the disclosure, a slip agent is selected from oleamide; erucamide; stearamide; and behenamide.

Fillers, Antiblocking Agents, and Reinforcing Agents

In embodiments of the disclosure, a filler, an antiblocking agent, or a reinforcing agents is selected from calcium carbonate; diatomaceous earth; natural and synthetic silica; silicates; glass fibers; asbestos; talc; kaolin; mica; barium sulfate; metal oxides and hydroxides; carbon black; and graphite.

If present, then in some embodiments of the disclosure, fillers may be incorporated into the thermoplastic polyolefin (e.g. the linear polyethylene) in amounts up to about 50 weight percent, or up to about 30 weight percent, or up to about 20 weight percent, or up to about 10 weight percent (based on the weight of the thermoplastic polyolefin).

Miscellaneous Additives

In embodiments of the disclosure, a miscellaneous additive is selected from plasticizers; epoxidized vegetable oils, such as epoxidized soybean oils; lubricants; emulsifiers; pigments; optical brighteners; flameproofing agents; antistatic agents; anti-fog agents; blowing agents; and thiosynergists, such as dilaurylthiodipropionate or distearylthiodipropionate.

Melt Extrusion

Extrudable compositions according to the present disclosure can be prepared by any one or a variety of ways. In an embodiment, the polymer processing aid components can be mixed with a thermoplastic polyolefin during a melt extrusion process. In an alternative embodiment, one or more of the polymer processing aid components can be formulated with a polyolefin, in a so called "masterbatch". Such a masterbatch may be used to deliver a useful, diluted amount of one or more of the polymer processing aid components. The masterbatch may be added to the bulk thermoplastic polyolefin for extrusion in a melt extrusion process into an extruded article.

The thermoplastic polyolefin to be extruded and the polymer processing aid components can be combined using any of the blending means well known to persons skilled in the art, such as for example, using a compounding mill, a BANBURY mixer, or a mixing extruder in which the polymer processing aid components are uniformly distributed within the thermoplastic polyolefin. Such mixing may be carried out at a temperature above the melting point, or the softening point of the polyolefin, or such mixing may simply be a dry blend mixing of solid thermoplastic polyolefin with polymer process aid components.

In an embodiment, an extrudable thermoplastic composition of the present disclosure will be prepared by melt blending a thermoplastic polyolefin (e.g. a linear polyethylene) with polymer processing aids prior to final extrusion in a melt extrusion process.

There are several methods which could be used to produce the extrudable thermoplastic compositions of the present disclosure. In an embodiment, all the components are dry blended in the desired weight ratio in a suitable device such as a tumble blender. The resulting dry blend is then melted in suitable equipment such as an extruder. In an alternative embodiment, a masterbatch could be prepared with some of the thermoplastic polyolefin and the other ingredients, including polymer processing aids or other additives. In such an embodiment, the thermoplastic polyolefin masterbatch is then fed to an extruder and melt blended with other components as desired including for example bulk polyolefin, polymer processing aids or other additives. In yet another embodiment, each of the components used to make up the extrudable thermoplastic composition may be metered directly into an extruder used for the melt extrusion process.

Melt extrusion processes are well known to persons skilled in the art. The extruder employed in embodiments of the present disclosure may be a twin or single screw extruder. If it a twin screw extruder is employed it may be operated in a co-rotating mode (i.e. both screws turning in the same direction) or in a counter rotating mode (i.e. the screws rotate in opposite directions).

The specific conditions for operation of any extruder in a melt extrusion process will differ from that of any other extruder. The variations between extruder machines may usually be resolved by routine optimization methods well known to persons skilled in the art. In an embodiment of the disclosure, a laboratory scale twin screw extruder will operate within the following envelope of conditions: the barrel will be heated to a temperature from about 180 to 210° C., or from about 190 to 200° C.; the screw speed will operate at from about 50 to about 150 rpm, or from about 100 to about 130 rpm. The specific conditions for the operation of any specific extruder can readily be determined by one skilled in the art by non-inventive testing in view of the foregoing envelope of conditions. The extruder will typically extrude a thermoplastic composition as strands which are then cooled and cut into pellets for subsequent use, such as for use in a film extrusion. The extruder used for the final extrusion may also be a single or twin screw extruder. The die may be a slot die or it may be an annular ring die extruding a film of the polyolefin about a stable bubble of air. The film is collapsed after passing over or about the bubble.

The specific details of extruders and their operation are known to persons skilled in the art. A typical extruder contains one (or two) flighted screws which rotate within a cylinder or "barrel". A thermoplastic polyolefin is sheared between the barrel and the screw by the stresses caused by the rotation of the screw. In addition, the barrel of the extruder may be heated. The shear and/or heat cause the thermoplastic polyolefin to melt and the action of the flighted screw transports it along the length of the extruder. The molten thermoplastic polyolefin extrudate is then forced through a die to form the desired plastic part.

In embodiment of the disclosure, a polymer processing aid is used during the melt extrusion of a thermoplastic polyolefin into a thermoplastic polyolefin extrudate.

In embodiments of the disclosure, the use of a polymer processing aid during the melt extrusion of a thermoplastic polyolefin into a thermoplastic polyolefin extrudate, decreases melt defects during the extrusion of the thermoplastic polyolefin.

In an embodiment of the disclosure, the use of a polymer processing aid during the melt extrusion of a thermoplastic polyolefin into a thermoplastic polyolefin extrudate, increases the shear rate at which the melt extrusion process may be operated without melt defects in the thermoplastic polyolefin extrudate, compared to the shear rate at which melt defects occur in the thermoplastic polyolefin extrude in the absence of the polymer processing aid.

In embodiments of the disclosure, the use of a polymer processing aid during the melt extrusion of a thermoplastic polyolefin into a thermoplastic polyolefin extrudate, increases the shear rate at which the melt extrusion process may be operated without melt defects in the thermoplastic polyolefin extrudate, by at least 10 percent, or at least 25 percent, or at least 50 percent, or at least 75 percent, or at least 100 percent, or at least 200 percent, or at least 300 percent, or at least 400 percent, or at least 500 percent, compared to the shear rate at which melt defects occur in the thermoplastic polyolefin extrudate in the absence of the polymer processing aid.

An embodiment of the disclosure is a method to reduce melt defects during the extrusion of a linear polyethylene, the method comprising: combining the linear polyethylene with i) at least one polyethylene glycol, and ii) a high pressure, low density polyethylene, LDPE to give an extrudable thermoplastic composition, and extruding the thermoplastic composition.

An embodiment of the disclosure is a method to reduce melt defects during the extrusion of a thermoplastic composition; the method comprising: combining a linear polyethylene with i) at least one polyalkylene glycol and ii) a high pressure low density polyethylene, LDPE to give the thermoplastic composition; and melt extruding the thermoplastic composition.

An alternative embodiment of the disclosure is a method to reduce melt defects during the extrusion of a linear polyethylene, the method comprising: combining the linear polyethylene with i) a first polyethylene glycol having a weight average molecular weight, $M_w$ of from 2,000 to 10,000 g/mol, and ii) a second polyethylene glycol having a weight average molecular weight, $M_w$ of from 15,000 to 50,000 g/mol to give an extrudable thermoplastic composition, and extruding the thermoplastic composition.

The following examples are presented for the purpose of illustrating selected embodiments of this disclosure; it being understood, that the examples presented do not limit the claims presented.

EXAMPLES

Polymer Characterization and Test Methods

Prior to testing, each polymer specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Polymer (e.g. the linear polyethylene or the LDPE) densities were determined using ASTM D792-13 (Nov. 1, 2013).

Melt Index

Polyethylene melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively.

Gel Permeation Chromatography (GPC)

Polyethylene samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four SHODEX columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 µL. The GPC columns were calibrated with narrow distribution polystyrene standards. The polystyrene molecular weights were converted to polyethylene molecular weights using the Mark-Houwink equation, as described in the ASTM standard test method D6474-12 (December 2012). The GPC raw data were processed with the CIRRUS® GPC software, to produce molar mass averages ($M_n$, $M_w$, $M_z$) and molar mass distribution (e.g. Polydispersity, $M_w/M_n$). In the polyethylene art, a commonly used term that is equivalent to GPC is SEC, i.e. Size Exclusion Chromatography.

Melt Extrusion

It has been observed that the performance of a polymer processing aid (a "PPA") in reducing melt defects in polyolefin extrudates is influenced by the shear rate at the extruder die. A generally accepted equation for the estimation of shear rate at the die is given by Eq 1:

$$\gamma = 2Q(S+2)/\rho\pi d^2 D \qquad (1)$$

where $\gamma$=shear rate (reciprocal seconds, $s^{-1}$); $\rho$=density of the polymer melt; S=1/power law index; d=die gap width; D=die diameter; and Q=mass flow rate of polymer.

A generally accepted estimate of density for molten polyethylene is 0.76 grams per cubic centimeter ($g/cm^3$) and this value was used for all calculations. A generally accepted value for power law index is 0.5 and this value was used in all calculations.

Examples Set A

A "semi-commercial" sized blown film line (manufactured by the Battenfeld Gloucester Engineering Company of Gloucester, Mass.) was used to determine the effectiveness of the addition of a polyethylene glycol (a "PEG") together with a high pressure linear low density polyethylene, LDPE, as a polymer processing aid (PPA).

The PEG used in an admixture or a masterbatch with a linear polyethylene was PEG 3350 having a weight average molecular weight, $M_w$ of about 3350 g/mol, or a mixture of PEG 3350 and PEG 300K having a weight average molecular weight, $M_w$ of about 300,000 g/mol. PEG 3350 and PEG 300K are commercially available from Clariant and Sumitomo Seika, respectively, and are sold under the tradenames of Polyglykol 3350 and PEO-1, respectively.

The high pressure low density polyethylene, LDPE used in an admixture with a linear polyethylene was an ethylene homopolymer made in a high pressure tubular reactor. The LDPE used was either LA-0522-A which has melt index of 4.6 g/10 min and a density of 0.920 $g/cm^3$, or LF-Y320-A which had a melt index of 0.25 g/10 min and a density of 0.920 $g/cm^3$, both of which are commercially available from NOVA Chemicals Corporation.

The linear polyethylene used in the present examples was a linear low density polyethylene, LLDPE having a density of 0.920 $g/cm^3$ and a melt index, $I_2$ of about 1.0 g/10 minutes sold under the tradename FP120 (or FP120-A) by NOVA Chemicals Corporation. FP120 is a copolymer of ethylene and 1-octene and is made in a solution phase polymerization process using a Ziegler-Natta catalyst.

The linear polyethylene, FP120 contained a conventional primary antioxidant (a hindered phenol=750 ppm IRGANOX 1076); a conventional secondary antioxidant (a phosphite=500 ppm IRGAFOS 168); and hydrotalcite (800 ppm) where ppm, or parts per million is based on the weight of the linear polyethylene. The linear polyethylene, FP120-A, contained a conventional primary antioxidant (a hindered phenol=750 ppm IRGANOX 1076); a conventional secondary antioxidant (a phosphite=500 ppm IRGAFOS 168); hydrotalcite (800 ppm); and 190 ppm of zinc oxide (ZnO) where ppm, or parts per million is based on the weight of the linear polyethylene.

In the experiments, the linear polyethylene (e.g. FP120-A) was pre-formulated (e.g. melt compounded in an extruder/pelletizer) with at least 500 ppm (by weight based on the weight of the linear polyethylene) of a polyethylene glycol (PEG). The amounts of polyglycol present in the linear polyethylene during the melt extrusion process could be further increased by adding a masterbatch of the linear polyethylene containing 2 weight percent of the appropriate polyethylene glycol. The high pressure linear low density polyethylene, LDPE was admixed (e.g. dry blended) with the pre-formulated linear polyethylene and the resulting thermoplastic polyolefin composition was fed to a Gloucester melt extrusion blown film line.

The Gloucester blown film line had a standard output of greater than 100 pounds per hour and is equipped with a 50 horsepower motor. The feed-screw had a 2.5 inch diameter and a length/diameter (L/D) ratio of 24/1. The feed-screw is a barrier design, and is fitted with a mixing element on the end of the screw. The film bubble is air cooled using chilled air, and the line was operated at a blow up ratio (BUR) of between 2/1 and 4/1. The blown film line was fitted with a 4 inch diameter annular die. Two die pins were utilized resulting in die gaps of 35 or 85 mils for the experiments. For each experiment, the output rate of the film line was increased from a minimum level of 39 lbs/hour (a shear rate of 35 $s^{-1}$ with the 85 mil die gap and 210 $s^{-1}$ with the 35 mil die gap) to a maximum of 129 lbs/hour (a shear rate of 116 $s^{-1}$ with the 85 mil die gap and 684 $s^{-1}$ with the 35 mil die gap) in 10 lb/hour increments. As the output rate was increased, the melt extrusion line operator noted the output rate at which the film transitioned from a film having a clear, defect free surface, to a film having obvious signs of surface imperfections which manifest as die lines, haze bands or small bands of soft melt fracture (orange peel) or hard melt fracture (shark-skin). The term melt fracture is well known to those skilled in the art. The shear rate at which melt fracture was first observed is noted in Table 1, and was not increased further, once melt fracture was observed.

Details of the components used in the extrudable thermoplastic composition and the melt extrusion process are provided in Table 1.

TABLE 1

The Onset of Melt Fracture in Extrudable Thermoplastic Polyolefin Compositions[1]

| Example No. | 1 | 2 | 3 | 4 | 5 | 6 |
|---|---|---|---|---|---|---|
| Linear Polyethylene | FP120 | FP120-A | FP120-A | FP120 | FP120 | FP120 |
| Selected Additives | 800 ppm hydrotalcite | 800 ppm hydrotalcite/ 190 ppm ZnO | 800 ppm hydrotalcite/ 190 ppm ZnO | 800 ppm hydrotalcite | 800 ppm hydrotalcite | 800 ppm hydrotalcite |
| Polymer Processing Aids |  |  |  |  |  |  |
| Polyethylene Glycol(s) | none | 500 ppm PEG 3350 | 1000 ppm PEG 3350 | none | none | 500 ppm PEG 3350 and 500 ppm PEG 300K |
| LDPE | none | none | none | 10 wt. % LF-Y320-A | 10 wt. % LA-0522-A | none |
| Output Rate at Onset of Melt Fracture (lbs/hour) | 69 | 100 | 40 | 55 | 55 | 130 |
| Shear Rate at Onset of Melt Fracture (s-1) | 62 | 90 | 212 | 49 | 49 | >690 |
| Frost Line Height (inches) | 8 | 8 | 12 | 8 | 7 | 23 |
| Nip Pressure (psi) | 30 | 30 | 30 | 30 | 30 | 30 |
| Die Mill Gap (mils) | 85 | 85 | 35 | 85 | 85 | 35 |
| Blow Up Ratio | 2.5:1 | 2.5:1 | 2.5:1 | 2.5:1 | 2.5:1 | 2.5:1 |
| Layflat | 15.7 | 15.7 | 15.7 | 15.7 | 15.7 | 15.7 |
| Thickness (mil) | 1 | 1 | 1 | 1 | 1 | 1 |
| Melt Temp. (° F.) | 428 | 430 | 428 | 429 | 430 | 431 |

| Example No. | 7 | 8 | 9 | 10 | 11 |
|---|---|---|---|---|---|
| Linear Polyethylene | FP120-A | FP120-A | FP120-A | FP120-A | FP120-A |
| Selected Additives | 800 ppm hydrotalcite/ 190 ppm ZnO | 800 ppm hydrotalcite/ 190 ppm ZnO | 800 ppm hydrotalcite/ 190 ppm ZnO | 800 ppm hydrotalcite/ 190 ppm ZnO | 800 ppm hydrotalcite/ 190 ppm ZnO |
| Polymer Processing Aids |  |  |  |  |  |
| Polyethylene Glycol(s) | 500 ppm PEG 3350 and 500 ppm PEG 300K | 1000 ppm PEG 3350 | 1000 ppm PEG 3350 | 500 ppm PEG 3350 and 500 ppm PEG 300K | 500 ppm PEG 3350 and 500 ppm PEG 300K |
| LDPE | none | 10 wt. % LF-Y320-A | 10 wt. % LA-0522-A | 10 wt. % LF-Y320-A | 10 wt. % LA-0522-A |
| Output Rate at Onset of Melt Fracture (lbs/hour) | 129 | 46 | 107 | 120 | 133 |
| Shear Rate at Onset of Melt Fracture (s-1) | >684 | 244 | 568 | 637 | >706 |
| Frost Line Height (inches) | 18 | 8 to 12 | 12 to 15 | 20 | 22 |
| Nip Pressure (psi) | 30 | 30 | 30 | 30 | 30 |
| Die Mill Gap (mils) | 35 | 35 | 35 | 35 | 35 |

TABLE 1-continued

The Onset of Melt Fracture in Extrudable Thermoplastic Polyolefin Compositions[1]

| Blow Up Ratio | 2.5:1 | 2.5:1 | 2.5:1 | 2.5:1 | 2.5:1 |
|---|---|---|---|---|---|
| Layflat | 15.7 | 15.7 | 15.7 | 15.7 | 15.7 |
| Thickness (mil) | 1.5 | 1.5 | 1.5 | 1.5 | 1.5 |
| Melt Temp. (° F.) | 433 | 430 | 430 | 435 | 435 |

Note[1]: PEG 3350 = polyethylene glycol with $M_w$ ~3350 g/mol; PEG 300K = polyethylene glycol with $M_w$ ~300,000 g/mol The data in Table 1, shows that a thermoplastic composition comprising a linear polyethylene and both a PEG and a LDPE could be extruded without melt fracture at a higher output rate/shear rate than a linear polyethylene alone, or a composition containing a linear polyethylene and only a low molecular weight PEG present as a polymer processing aid. The data in Table 1, further shows that the use of a LDPE having a higher melt index, $I_2$ (e.g. LA-0522-A which has melt index of 4.6 g/10 min) works better to reduce melt fracture that does the use of a LDPE having a lower melt index, $I_2$ (e.g. LF-Y320-A which had a melt index of 0.25 g/10 min).

Examples Set B

Extrudable thermoplastic compositions for blown film extrusion were prepared by melt compounding a linear polyethylene with polymer processing aids and other additives on a Leistritz twin-screw pelletizer under mild conditions with nitrogen purge (see Table 2 for conditions).

TABLE 2

Melt Compounding Conditions

| Amperage (amps) | 21.4-21.9 |
|---|---|
| Nitrogen Purge | On |
| Output (pounds/hour) | 20-22 |
| Pressure (psi) | 1310-1370 |
| Melt Temp. (° C.) | 198 |

The fluoropolymer processing aid used in an admixture with a linear polyethylene was DYNAMAR FX 5929M commercially available from 3M.

The PEG used in an admixture with a linear polyethylene was a 1:1 blend of PEG 3350 having a weight average molecular weight, $M_w$, of about 3350 g/mol and PEG 35000 having a weight average molecular weight, $M_w$, of about 35,000 g/mol. PEG 3350 and PEG 35000 is commercially available from Clariant and are sold under the tradenames of Polyglykol 3350 and Polyglykol 35000, respectively.

The linear polyethylene used in the present examples was a linear low density polyethylene, LLDPE having a density of 0.913 g/cm³ and a melt index, $I_2$ of about 0.85 g/10 min sold under the tradename VPsK914 (or VPsK914-A, or VPsK914-A04, or VPsK914-C) by NOVA Chemicals. VPsK914 is copolymer of ethylene and 1-octene and is made in a solution phase polymerization process using a dual reactor single site catalyst and Ziegler-Natta catalyst technology.

The linear polyethylene, VPsK914 contained a conventional primary antioxidant (a hindered phenol=350 ppm IRGANOX 1076); a conventional secondary antioxidant (a phosphite=500 ppm IRGAFOS 168); a specialty antioxidant (500 ppm SUMILIZER® GP); and hydrotalcite (800 ppm) where ppm, or parts per million is based on the weight of the linear polyethylene.

A monolayer blown film line equipped with a 3 inch diameter die (manufactured by Macro Engineering & Technology Inc. based in Ontario, CA) was used to determine the effectiveness of the addition of a polyethylene glycol (PEG) and a LDPE as a polymer processing aid (PPA) in clearing melt defects from an extrudate.

The 3 inch Macro blown film line had a standard output of greater than 60 pounds per hour and is equipped with a 15 horsepower motor. The feed-screw had a 1.5 inch diameter and a length/diameter (L/D) ratio of 24/1. The feed-screw is a barrier design, and is fitted with a mixing element on the end of the screw. The film bubble is air cooled using chilled air, and the line was operated at a blow up ratio (BUR) of between 2/1 and 4/1. The blown film line was fitted with a 3 inch diameter annular die. Two die pins were utilized resulting in die gaps of 35 for the experiments.

In Example 12, the linear polyethylene, VPsK914-A was pre-formulated (e.g. melt compounded in an extruder/pelletizer) with 1,000 ppm (by weight based on the weight of the linear polyethylene) of a fluoropolymer process aid (3M DYNAMAR FX 5929M) and was then melt extruded on the blown film line.

In Example 13, the linear polyethylene, VPsK914-A was pre-formulated (e.g. melt compounded in an extruder/pelletizer) with 1,000 ppm (by weight based on the weight of the linear polyethylene) of a 1:1 blend of PEG 3350 and PEG 35000 and was then melt extruded on the blown film line.

In Example 14, the linear polyethylene, VPsK914-A was pre-formulated (e.g. melt compounded in an extruder/pelletizer) with 1,000 ppm (by weight based on the weight of the linear polyethylene) of a 1:1 blend of PEG 3350 and PEG 35000 and 5 weight percent (based on the total weight of the linear polyethylene and the LDPE) of a high pressure low density polyethylene (NOVAPOL® LA-0522-A, which has a density of 0.920 g/cm³ and a melt index, $I_2$ of 4.6 g/10 min) and was then melt extruded on the blown film line.

In Example 15, the linear polyethylene, VPsK914-A was not pre-formulated with a PPA. The VPsK914-A was melt extruded on the blown film line.

During the melt fracture clearing experiments on the blown film line, the extruder was operated with a mass flow rate "aiming point" of about 65 pounds per hour (corresponding to a shear rate of about 460 s$^{-1}$). The term "melt fracture" is well known to those skilled in the art and generally refers to a film having obvious signs of surface imperfections which manifest as die lines, haze bands or small bands of soft melt fracture (orange peel) or hard melt fracture (shark-skin). The phrase "clear of melt fracture" means a film has a clear, defect free surface.

Details of the components used in the extrudable thermoplastic composition and the melt extrusion process are provided in Table 3.

TABLE 3

Melt Fracture Clearing in Extrudable Thermoplastic Polyolefin Compositions

| Example No. | 12 | 13 | 14 | 15 |
|---|---|---|---|---|
| Linear Polyethylene | VPsK914-A | VPsK914-A | VPsK914-A | VPsK914-A |
| Selected Additives | 800 ppm hydrotalcite | 800 ppm hydrotalcite | 800 ppm hydrotalcite | 800 ppm hydrotalcite |
| Polymer Processing Aids | 1,000 ppm of 3M DYNAMAR FX 5929M | 1,000 ppm of 1:1 PEG 3350 and PEG 35000 | 1,000 ppm of 1:1 PEG 3350 and PEG 35000; 5 wt % NOVAPOL LA-0522-A | none |
| Output Rate (lbs/hour) | 65 | 65 | 65 | 65 |
| Shear Rate (s$^{-1}$) | 460 | 460 | 460 | 460 |
| Frost Line Height (inches) | 10 | 10 | 10 | 7 |
| Die Mill Gap (mils) | 35 | 35 | 35 | 35 |
| Blow Up Ratio | 2.5:1 | 2.5:1 | 2.5:1 | 2.5:1 |
| Thickness (mil) | 1.0 | 1.0 | 1.0 | 1.0 |
| Melt Temp. (° F.) | 458 | 468 | 461 | 494 |

Note 2:
PEG 3350 = polyethylene glycol with $M_w$ ~3350 g/mol; PEG 35000 = polyethylene glycol with $M_w$ ~35000 g/mol.

Before the addition of a target thermoplastic composition, the blown film line was purged using a resin containing 30-40% of diatomaceous earth which was free of any polymer processing aids to clean the die by abrasion. Following purging, a PPA free LLDPE with a melt index of 0.8 g/10 min was introduced to produce an extrudate having 100% hard melt fracture across the entire width of the film (e.g. to produce film having gross surface defects with similar appearance to shark skin). Next, the target thermoplastic composition was introduced and this was recoded as time zero. The target thermoplastic composition was extruded under constant conditions and swatches of the extrudate film were collected every ten minutes to measure melt fracture defects as a percentage of the width of the swatch. The melt extrusion process was continued for 80 minutes for each experiment, and the melt fracture percentage was recorded in ten minute intervals. The thermoplastic composition extrudate was considered to be clear of melt fracture, when the melt fracture percentage reached zero. The results of the melt fracture clearing experiments are shown in FIG. 1.

A person skilled in the art will observe from the data provided in FIG. 1, that a thermoplastic composition comprising a linear polyethylene, a PEG mixture (a 1:1 mixture of PEG 3350 and PEG 35000) and a LDPE began to clear melt fracture after about 30 minutes and was able to clear melt fracture almost completely within about 70 minutes, which was similar to a thermoplastic composition comprising a linear polyethylene and a both an elastomeric fluoropolymer and a polyethylene glycol (DYNAMAR FX 5929M is a fluoroelastomeric polymer sold as a mixture with a polyethylene glycol) as a PPA. The data in FIG. 1 also shows that a mixture of PEG 3350 and PEG 35000 has some effectiveness on its own as a polymer processing aid, although melt fracture clearance was not as effective as when the LDPE material was also included.

Non-limiting embodiments of the present disclosure include the following:

Embodiment A. A process for preparing a thermoplastic composition extrudate, the process comprising extruding a thermoplastic composition in a melt extrusion process; the thermoplastic composition comprising: i) a linear polyethylene; ii) from 200 to 4,000 parts per million (based on the weight the linear polyethylene) of at least one polyethylene glycol; and iii) from 3.0 to 15.0 weight percent of a high pressure low density polyethylene, LDPE (based on the total weight of the linear polyethylene and the high pressure low density polyethylene, LDPE);
wherein the linear polyethylene is selected from the group consisting of LLDPE, MDPE, VLDPE, HDPE, and mixtures thereof;
wherein the thermoplastic composition is substantially free of fluoropolymers; and
wherein the melt extrusion process is carried out in the absence of fluoropolymers.

Embodiment B. The process of Embodiment A, wherein the linear polyethylene comprises zinc oxide.

Embodiment C. The process of Embodiment A or B, wherein the linear polyethylene comprises hydrotalcite.

Embodiment D. The process of Embodiment A, B, or C wherein the high pressure low density polyethylene, LDPE has a melt index, $I_2$ of at least 2.5 g/10 min.

Embodiment E. The process of Embodiment A, B or C wherein the high pressure low density polyethylene, LDPE has a melt index, $I_2$ of from 2.5 to 10.0 g/10 min.

Embodiment F. The process of Embodiment A, B, C, D, or E wherein the linear polyethylene is a LLDPE.

Embodiment G. The process of Embodiment F, wherein the LLDPE has a melt index, $I_2$ of from 0.1 to 5.0 grams per 10 minutes.

Embodiment H. The process of Embodiment F, or G wherein the LLDPE has a density of from 0.910 to 0.936 g/cm$^3$.

Embodiment I. The process of Embodiment F, G, or H, wherein the LLDPE is an ethylene copolymer comprising polymerized ethylene and one or more alpha olefin selected from the group consisting of 1-butene, 1-hexene, and 1-octene.

Embodiment J. The process of Embodiment A, B, C, D, E, F, G, H, or I wherein the at least one polyethylene glycol is a polyethylene glycol having a weight average molecular weight, $M_w$ of less than 20,000 g/mol.

Embodiment K. The process of Embodiment A, B, C, D, E, F, G, H, or I wherein the at least one polyethylene glycol is a polyethylene glycol having a weight average molecular weight, $M_w$ of at least 50,000 g/mol.

Embodiment L. The process of Embodiment A, B, C, D, E, F, G, H, or I wherein the at least one polyethylene glycol is a first polyethylene glycol having a weight average molecular weight, $M_w$ of less than 20,000 g/mol, and a second polyethylene glycol having a weight average molecular weight, $M_w$ of at least 50,000 g/mol.

Embodiment M. The process of Embodiment A, B, C, D, E, F, G, H, or I wherein the at least one polyethylene glycol is a polyethylene glycol having a weight average molecular weight, $M_w$ of from 25,000 to 50,000 g/mol.

Embodiment N. The process of Embodiment A, B, C, D, E, F, G, H, or I wherein the at least one polyethylene glycol is a first polyethylene glycol having a weight average molecular weight, $M_w$ of from about 2,000 to about 10,000 g/mol, and a second polyethylene glycol having a weight average molecular weight, $M_w$ of from about 15,000 to about 25,000 g/mol.

Embodiment O. The process of Embodiment A, B, C, D, E, F, G, H, or I wherein the at least one polyethylene glycol is a first polyethylene glycol having a weight average molecular weight, $M_w$ of from about 2,000 to about 10,000 g/mol, and a second polyethylene glycol having a weight average molecular weight, $M_w$ of from about 25,000 to about 50,000 g/mol.

Embodiment P. The process of Embodiment A, B, C, D, E, F, G, H, or I wherein the at least one polyethylene glycol is a first polyethylene glycol having a weight average molecular weight, $M_w$ of from about 2,000 to about 10,000 g/mol, and a second polyethylene glycol having a weight average molecular weight, $M_w$ of from about 250,000 to about 350,000 g/mol.

Embodiment Q. The process of Embodiment A, B, C, D, E, F, G, H, I, J, K, L, M, N, O, or P wherein the thermoplastic composition comprises from 200 to 2,000 parts per million (based on the weight the linear polyethylene) of the least one polyethylene glycol.

Embodiment R. The process of Embodiment A, B, C, D, E, F, G, H, I, J, K, L, M, N, O, P, or Q wherein the melt extrusion process is conducted at a shear rate which would produce a thermoplastic composition extrudate having melt fracture defects if carried out using a thermoplastic composition consisting essentially of the linear polyethylene.

Embodiment S. An extrudable thermoplastic composition comprising: i) a linear polyethylene; ii) from 200 to 4,000 parts per million (based on the weight the linear polyethylene) of at least one polyethylene glycol; and iii) from 3.0 to 15.0 weight percent of a high pressure low density polyethylene, LDPE (based on the total weight of the linear polyethylene and the high pressure low density polyethylene, LDPE);
wherein the extrudable thermoplastic composition is substantially free of fluoropolymers; and
wherein the linear polyethylene is selected from the group consisting of LLDPE, MDPE, VLDPE, HDPE, and mixtures thereof.

Embodiment T. The extrudable thermoplastic composition of Embodiment S wherein the linear polyethylene comprises zinc oxide.

Embodiment U. The extrudable thermoplastic composition of Embodiment S or T wherein the linear polyethylene comprises hydrotalcite.

Embodiment V. The extrudable thermoplastic composition of Embodiment S, T, or U wherein the high pressure low density polyethylene, LDPE has a melt index, $I_2$ of at least 2.5 g/10 min.

Embodiment W. The extrudable thermoplastic composition of Embodiment S, T, or U wherein the high pressure low density polyethylene, LDPE has a melt index, $I_2$ of from 2.5 to 10.0 g/10 min.

Embodiment X. The extrudable thermoplastic composition of Embodiment S, T, U, or W wherein the linear polyethylene is a LLDPE.

Embodiment Y. The extrudable thermoplastic composition of Embodiment X wherein the LLDPE has a melt index, $I_2$ of from 0.1 to 5.0 grams per 10 minutes.

Embodiment Z. The extrudable thermoplastic composition of Embodiment X, or Y wherein the LLDPE has a density of from 0.910 to 0.936 g/cm$^3$.

Embodiment AA. The extrudable thermoplastic composition of Embodiment X, Y, or Z wherein the LLDPE is an ethylene copolymer comprising polymerized ethylene and one or more alpha olefin selected from the group consisting of 1-butene, 1-hexene, and 1-octene.

Embodiment BB. The extrudable thermoplastic composition of Embodiment S, T, U, V, W, X, Y, Z, or AA wherein the at least one polyethylene glycol is a polyethylene glycol having a weight average molecular weight, $M_w$ of less than 20,000 g/mol.

Embodiment CC. The extrudable thermoplastic composition of Embodiment S, T, U, V, W, X, Y, Z, or AA wherein the at least one polyethylene glycol is a polyethylene glycol having a weight average molecular weight, $M_w$ of at least 50,000 g/mol.

Embodiment DD. The extrudable thermoplastic composition of Embodiment S, T, U, V, W, X, Y, Z, or AA wherein the at least one polyethylene glycol is a first polyethylene glycol having a weight average molecular weight, $M_w$ of less than 20,000 g/mol, and a second polyethylene glycol having a weight average molecular weight, $M_w$ of at least 50,000 g/mol.

Embodiment EE. The extrudable thermoplastic composition of Embodiment S, T, U, V, W, X, Y, Z, or AA wherein the at least one polyethylene glycol is a polyethylene glycol having a weight average molecular weight, $M_w$ of from 25,000 to 50,000 g/mol.

Embodiment FF. The extrudable thermoplastic composition of Embodiment S, T, U, V, W, X, Y, Z, or AA wherein the at least one polyethylene glycol is a first polyethylene glycol having a weight average molecular weight, $M_w$ of from about 2,000 to about 10,000 g/mol, and a second polyethylene glycol having a weight average molecular weight, $M_w$ of from about 15,000 to about 25,000 g/mol.

Embodiment GG. The extrudable thermoplastic composition Embodiment S, T, U, V, W, X, Y, Z, or AA wherein the at least one polyethylene glycol is a first polyethylene glycol having a weight average molecular weight, $M_w$ of from about 2,000 to about 10,000 g/mol, and a second polyethylene glycol having a weight average molecular weight, $M_w$ of from about 25,000 to about 50,000 g/mol.

Embodiment HH. The extrudable thermoplastic composition Embodiment S, T, U, V, W, X, Y, Z, or AA wherein the at least one polyethylene glycol is a first polyethylene glycol having a weight average molecular weight, $M_w$ of from about 2,000 to about 10,000 g/mol, and a second polyethylene glycol having a weight average molecular weight, $M_w$ of from about 250,000 to about 350,000 g/mol.

Embodiment II. The extrudable thermoplastic composition of Embodiment S, T, U, V, W, X, Y, Z, AA, BB, CC, DD, EE, FF, GG, or HH wherein the thermoplastic composition comprises from 200 to 2,000 parts per million (based on the weight the linear polyethylene) of at least one polyethylene glycol.

Embodiment JJ. A process for preparing a thermoplastic composition extrudate, the process comprising:
a) preparing a thermoplastic composition by combining a linear polyethylene with i) 200 to 4,000 parts per million of at least one polyethylene glycol (based on the weight of the linear polyethylene) and ii) from 3.0 weight percent to 15.0 weight percent of a high pressure low density polyethylene, LDPE (based on the total weight of the linear polyethylene and the high pressure low density polyethylene, LDPE); and b) extruding the thermoplastic composition in a melt extrusion process;

wherein the linear polyethylene is selected from the group consisting of LLDPE, MDPE, VLDPE, HDPE, and mixtures thereof;

wherein the thermoplastic composition is substantially free of fluoropolymers; and wherein the melt extrusion process is carried out in the absence of fluoropolymers.

Embodiment KK. The process of Embodiment JJ, wherein the linear polyethylene comprises zinc oxide.

Embodiment LL. The process of Embodiment JJ or KK wherein the linear polyethylene comprises hydrotalcite.

Embodiment MM. A process for preparing a thermoplastic composition extrudate, the process comprising extruding a thermoplastic composition in a melt extrusion process; the thermoplastic composition comprising: i) a linear polyethylene; ii) a first polyethylene glycol having a weight average molecular weight, $M_w$ of from 2,000 to 10,000 g/mol; and iii) a second polyethylene glycol having a weight average molecular weight, $M_w$ of from 15,000 to 50,000 g/mol;

wherein the linear polyethylene is selected from the group consisting of LLDPE, MDPE, VLDPE, HDPE, and mixtures thereof;

wherein the thermoplastic composition is substantially free of fluoropolymers; and wherein the melt extrusion process is carried out in the absence of fluoropolymers.

Embodiment NN. The process of Embodiment MM, wherein the linear polyethylene comprises zinc oxide.

Embodiment OO. The process of Embodiment MM, or NN wherein the linear polyethylene comprises hydrotalcite.

Embodiment PP. The process of Embodiment MM, NN, or OO wherein the linear polyethylene is a LLDPE.

Embodiment QQ. The process of Embodiment PP wherein the LLDPE has a melt index, $I_2$ of from 0.1 to 5.0 grams per 10 minutes.

Embodiment RR. The process of Embodiment PP or QQ wherein the LLDPE has a density of from 0.910 to 0.936 g/cm$^3$.

Embodiment SS. The process of Embodiment PP, QQ, or RR wherein the LLDPE is an ethylene copolymer comprising polymerized ethylene and one or more alpha olefin selected from the group consisting of 1-butene, 1-hexene, and 1-octene.

Embodiment TT. The process of Embodiment MM, NN, OO, PP, QQ, RR, or SS wherein the first polyethylene glycol has a weight average molecular weight, $M_w$ of from 2,000 to 8,000 g/mol.

Embodiment UU. The process of Embodiment MM, NN, OO, PP, QQ, RR, or SS wherein the first polyethylene glycol has a weight average molecular weight, $M_w$ of from 2,000 to 5,000 g/mol.

Embodiment VV. The process of Embodiment MM, NN, OO, PP, QQ, RR, or SS wherein the first polyethylene glycol has a weight average molecular weight, $M_w$ of about 3,350 g/mol.

Embodiment WW. The process of Embodiment MM, NN, OO, PP, QQ, RR, or SS wherein the second polyethylene glycol has a weight average molecular weight, $M_w$ of from 15,000 to 25,000 g/mol.

Embodiment XX. The process of Embodiment MM, NN, OO, PP, QQ, RR, or SS wherein the second polyethylene glycol has a weight average molecular weight, $M_w$ of from 25,000 to 50,000 g/mol.

Embodiment YY. The process of Embodiment MM, NN, OO, PP, QQ, RR, or SS wherein the second polyethylene glycol has a weight average molecular weight, $M_w$ of about 35,000 g/mol.

Embodiment ZZ. The process of Embodiment MM, NN, OO, PP, QQ, RR, or SS wherein the first polyethylene glycol has a weight average molecular weight, $M_w$ of from 2,000 to 8,000 g/mol and the second polyethylene glycol has a weight average molecular weight, $M_w$ of from 25,000 to 50,000 g/mol.

Embodiment AAA. The process of Embodiment MM, NN, OO, PP, QQ, RR, or SS wherein the first polyethylene glycol has a weight average molecular weight, $M_w$ of from 2,000 to 5,000 g/mol and the second polyethylene glycol has a weight average molecular weight, $M_w$ of from 25,000 to 50,000 g/mol.

Embodiment BBB. The process of Embodiment MM, NN, OO, PP, QQ, RR, or SS wherein the first polyethylene glycol has a weight average molecular weight, $M_w$ of about 3,350 g/mol, and the second polyethylene glycol has a weight average molecular weight, $M_w$ of about 35,000 g/mol.

Embodiment CCC. The process of Embodiment MM, NN, OO, PP, QQ, RR, SS, TT, UU, VV, WW, XX, YY, ZZ, AAA, or BBB wherein the thermoplastic composition comprises from 200 to 2,000 parts per million (based on the weight the linear polyethylene) of the first polyethylene glycol and from 200 to 2,000 parts per million (based on the weight the linear polyethylene) of the second polyethylene glycol.

Embodiment DDD. The process of Embodiment MM, NN, OO, PP, QQ, RR, SS, TT, UU, VV, WW, XX, YY, ZZ, AAA, BBB, or CCC wherein the melt extrusion process is conducted at a shear rate which would produce a thermoplastic composition extrudate having melt fracture defects if carried out using a thermoplastic composition consisting essentially of the linear polyethylene.

Embodiment EEE. An extrudable thermoplastic composition comprising: i) a linear polyethylene; ii) a first polyethylene glycol having a weight average molecular weight, $M_w$ of from 2,000 to 10,000 g/mol; and iii) a second polyethylene glycol having a weight average molecular weight, $M_w$ of from 15,000 to 50,000 g/mol;

wherein the extrudable thermoplastic composition is substantially free of fluoropolymers; and wherein the linear polyethylene is selected from the group consisting of LLDPE, MDPE, VLDPE, HDPE, and mixtures thereof.

Embodiment FFF. The extrudable thermoplastic composition of Embodiment EEE wherein the linear polyethylene comprises zinc oxide.

Embodiment GGG. The extrudable thermoplastic composition of Embodiment EEE or FFF wherein the linear polyethylene comprises hydrotalcite.

Embodiment HHH. The extrudable thermoplastic composition of Embodiment EEE, FFF, or GGG wherein the linear polyethylene is a LLDPE.

Embodiment III. The extrudable thermoplastic composition of Embodiment HHH wherein the LLDPE has a melt index, $I_2$ of from 0.1 to 5.0 grams per 10 minutes.

Embodiment JJJ. The extrudable thermoplastic composition of Embodiment HHH or III wherein the LLDPE has a density of from 0.910 to 0.936 g/cm$^3$.

Embodiment KKK. The extrudable thermoplastic composition of Embodiment HHH, III, or JJJ wherein the LLDPE is an ethylene copolymer comprising polymerized ethylene and one or more alpha olefin selected from the group consisting of 1-butene, 1-hexene, and 1-octene.

Embodiment LLL. The extrudable thermoplastic composition of Embodiment EEE, FFF, GGG, HHH, III, JJJ, or KKK wherein the first polyethylene glycol has a weight average molecular weight, $M_w$ of from 2,000 to 8,000 g/mol.

Embodiment MMM. The extrudable thermoplastic composition of Embodiment EEE, FFF, GGG, HHH, III, JJJ, or KKK wherein the first polyethylene glycol has a weight average molecular weight, $M_w$ of from 2,000 to 5,000 g/mol.

Embodiment NNN. The extrudable thermoplastic composition of Embodiment EEE, FFF, GGG, HHH, III, JJJ, or KKK wherein the first polyethylene glycol has a weight average molecular weight, $M_w$ of about 3,350 g/mol.

Embodiment OOO. The extrudable thermoplastic composition of Embodiment EEE, FFF, GGG, HHH, III, JJJ, or KKK wherein the second polyethylene glycol has a weight average molecular weight, $M_w$ of from 15,000 to 25,000 g/mol.

Embodiment PPP. The extrudable thermoplastic composition of Embodiment EEE, FFF, GGG, HHH, III, JJJ, or KKK wherein the second polyethylene glycol has a weight average molecular weight, $M_w$ of from 25,000 to 50,000 g/mol.

Embodiment QQQ. The extrudable thermoplastic composition of Embodiment EEE, FFF, GGG, HHH, III, JJJ, or KKK wherein the second polyethylene glycol has a weight average molecular weight, $M_w$ of about 35,000 g/mol.

Embodiment RRR. The extrudable thermoplastic composition of Embodiment EEE, FFF, GGG, HHH, III, JJJ, or KKK wherein the first polyethylene glycol has a weight average molecular weight, $M_w$ of from 2,000 to 8,000 g/mol and the second polyethylene glycol has a weight average molecular weight, $M_w$ of from 25,000 to 50,000 g/mol.

Embodiment SSS. The extrudable thermoplastic composition of Embodiment EEE, FFF, GGG, HHH, III, JJJ, or KKK wherein the first polyethylene glycol has a weight average molecular weight, $M_w$ of from 2,000 to 5,000 g/mol and the second polyethylene glycol has a weight average molecular weight, $M_w$ of from 25,000 to 50,000 g/mol.

Embodiment TTT. The extrudable thermoplastic composition of Embodiment EEE, FFF, GGG, HHH, III, JJJ, or KKK wherein the first polyethylene glycol has a weight average molecular weight, $M_w$ of about 3,350 g/mol, and the second polyethylene glycol has a weight average molecular weight, $M_w$ of about 35,000 g/mol.

Embodiment UUU. The extrudable thermoplastic composition of Embodiment EEE, FFF, GGG, HHH, III, JJJ, KKK, LLL, MMM, NNN, OOO, PPP, QQQ, RRR, SSS, or TTT wherein the thermoplastic composition comprises from 200 to 2,000 parts per million (based on the weight the linear polyethylene) of the first polyethylene glycol and from 200 to 2,000 parts per million (based on the weight the linear polyethylene) of the second polyethylene glycol.

Embodiment VVV. A process for preparing a thermoplastic composition extrudate, the process comprising:
a) preparing a thermoplastic composition by combining a linear polyethylene with i) 200 to 2,000 parts per million (based on the weight of the linear polyethylene) of a first polyethylene glycol having a weight average molecular weight, $M_w$ of from 2,000 to 10,000 g/mol; and ii) 200 to 2,000 parts per million (based on the weight of the linear polyethylene) of a second polyethylene glycol having a weight average molecular weight, $M_w$ of from 15,000 to 50,000 g/mol; and
b) extruding the thermoplastic composition in a melt extrusion process;
wherein the linear polyethylene is selected from the group consisting of LLDPE, MDPE, VLDPE, HDPE, and mixtures thereof;
wherein the thermoplastic composition is substantially free of fluoropolymers; and
wherein the melt extrusion process is carried out in the absence of fluoropolymers.

Embodiment WWW. The process of Embodiment VVV wherein the linear polyethylene comprises zinc oxide.

Embodiment XXX. The process of Embodiment VVV or WWW wherein the linear polyethylene comprises hydrotalcite.

INDUSTRIAL APPLICABILITY

Polymer processing aids (PPAs) are provided which reduce melt fracture defects in extruded polyolefins in the absence of fluoropolymers.

The invention claimed is:

1. A process for preparing a thermoplastic composition extrudate, the process comprising extruding a thermoplastic composition in a melt extrusion process; the thermoplastic composition comprising:
i) a linear polyethylene;
ii) from 200 to 4,000 parts per million of at least one polyethylene glycol based on the weight the linear polyethylene; and
iii) from 3.0 to 15.0 weight percent of a high pressure low density polyethylene (LDPE) based on the total weight of the linear polyethylene and the high pressure LDPE;
wherein the linear polyethylene is selected from the group consisting of linear low density polyethylene (LLDPE), medium density polyethylene (MDPE), very low density polyethylene (VLDPE), high density polyethylene (HDPE), and mixtures thereof;
wherein the thermoplastic composition is substantially free of fluoropolymers; and
wherein the melt extrusion process is carried out in the absence of fluoropolymers.

2. The process of claim 1, wherein the linear polyethylene comprises zinc oxide.

3. The process of claim 1, wherein the linear polyethylene comprises hydrotalcite.

4. The process of claim 1, wherein the high pressure LDPE has a melt index, $I_2$ of at least 2.5 g/10 min.

5. The process of claim 1, wherein the high pressure LDPE has a melt index, $I_2$ of from 2.5 to 10.0 g/10 min.

6. The process of claim 1, wherein the linear polyethylene is LLDPE.

7. The process of claim 6, wherein the LLDPE has a melt index, $I_2$ of from 0.1 to 5.0 grams per 10 minutes.

8. The process of claim 6, wherein the LLDPE has a density of from 0.910 to 0.936 g/cm$^3$.

9. The process of claim 6, wherein the LLDPE is an ethylene copolymer comprising polymerized ethylene and one or more alpha olefin selected from the group consisting of 1-butene, 1-hexene, and 1-octene.

10. The process of claim 1, wherein the at least one polyethylene glycol is a polyethylene glycol having a weight average molecular weight, $M_W$ of less than 20,000 g/mol.

11. The process of claim 1, wherein the at least one polyethylene glycol is a polyethylene glycol having a weight average molecular weight, $M_w$ of at least 50,000 g/mol.

12. The process of claim 1, wherein the at least one polyethylene glycol is a polyethylene glycol having a weight average molecular weight, $M_w$ of from 25,000 to 50,000 g/mol.

13. The process of claim 1, wherein the at least one polyethylene glycol is a first polyethylene glycol having a weight average molecular weight, $M_w$ of less than 20,000 g/mol, and a second polyethylene glycol having a weight average molecular weight, $M_w$ of at least 50,000 g/mol.

14. The process of claim 1, wherein the at least one polyethylene glycol is a first polyethylene glycol having a weight average molecular weight, $M_w$ of from 2,000 to 10,000 g/mol, and a second polyethylene glycol having a weight average molecular weight, $M_w$ of from 15,000 to 25,000 g/mol.

15. The process of claim 1, wherein the at least one polyethylene glycol is a first polyethylene glycol having a weight average molecular weight, $M_w$ of from 2,000 to 10,000 g/mol, and a second polyethylene glycol having a weight average molecular weight, $M_w$ of from 25,000 to 50,000 g/mol.

16. The process of claim 1, wherein the at least one polyethylene glycol is a first polyethylene glycol having a weight average molecular weight, $M_w$ of from 2,000 to 10,000 g/mol, and a second polyethylene glycol having a weight average molecular weight, $M_w$ of from 250,000 to 350,000 g/mol.

17. The process of claim 1, wherein the thermoplastic composition comprises from 200 to 2,000 parts per million of the at least one polyethylene glycol, based on the weight the linear polyethylene.

18. The process of claim 1, wherein the melt extrusion process is conducted at a shear rate which would produce a thermoplastic composition extrudate having melt fracture defects if carried out using a thermoplastic composition consisting essentially of the linear polyethylene.

19. An extrudable thermoplastic composition comprising:
   i) a linear polyethylene;
   ii) from 200 to 4,000 parts per million of at least one polyethylene glycol based on the weight the linear polyethylene; and
   iii) from 3.0 to 15.0 weight percent of a high pressure low density polyethylene (LDPE) based on the total weight of the linear polyethylene and the high pressure LDPE;
   wherein the extrudable thermoplastic composition is substantially free of fluoropolymers; and
   wherein the linear polyethylene is selected from the group consisting of linear low density polyethylene (LLDPE), medium density polyethylene (MDPE), very low density polyethylene (VLDPE), high density polyethylene (HDPE), and mixtures thereof.

20. The extrudable thermoplastic composition of claim 19, wherein the linear polyethylene comprises zinc oxide.

21. The extrudable thermoplastic composition of claim 19, wherein the linear polyethylene comprises hydrotalcite.

22. The extrudable thermoplastic composition of claim 19, wherein the high pressure LDPE has a melt index, $I_2$ of at least 2.5 g/10 min.

23. The extrudable thermoplastic composition of claim 19, wherein the high pressure LDPE has a melt index, $I_2$ of from 2.5 to 10.0 g/10 min.

24. The extrudable thermoplastic composition of claim 19, wherein the linear polyethylene is a LLDPE.

25. The extrudable thermoplastic composition of claim 24, wherein the LLDPE has a melt index, $I_2$ of from 0.1 to 5.0 grams per 10 minutes.

26. The extrudable thermoplastic composition of claim 24, wherein the LLDPE has a density of from 0.910 to 0.936 g/cm$^3$.

27. The extrudable thermoplastic composition of claim 24, wherein the LLDPE is an ethylene copolymer comprising polymerized ethylene and one or more alpha olefin selected from the group consisting of 1-butene, 1-hexene, and 1-octene.

28. The extrudable thermoplastic composition of claim 19, wherein the at least one polyethylene glycol is a polyethylene glycol having a weight average molecular weight, $M_w$ of less than 20,000 g/mol.

29. The extrudable thermoplastic composition of claim 19, wherein the at least one polyethylene glycol is a polyethylene glycol having a weight average molecular weight, $M_w$ of at least 50,000 g/mol.

30. The extrudable thermoplastic composition of claim 19, wherein the at least one polyethylene glycol is a polyethylene glycol having a weight average molecular weight, $M_w$ of from 25,000 to 50,000 g/mol.

31. The extrudable thermoplastic composition of claim 19, wherein the at least one polyethylene glycol is a first polyethylene glycol having a weight average molecular weight, $M_w$ of less than 20,000 g/mol, and a second polyethylene glycol having a weight average molecular weight, $M_w$ of at least 50,000 g/mol.

32. The extrudable thermoplastic composition of claim 19, wherein the at least one polyethylene glycol is a first polyethylene glycol having a weight average molecular weight, $M_w$ of from 2,000 to 10,000 g/mol, and a second polyethylene glycol having a weight average molecular weight, $M_w$ of from 15,000 to 25,000 g/mol.

33. The extrudable thermoplastic composition of claim 19, wherein the at least one polyethylene glycol is a first polyethylene glycol having a weight average molecular weight, $M_w$ of from 2,000 to 10,000 g/mol, and a second polyethylene glycol having a weight average molecular weight, $M_w$ of from 25,000 to 50,000 g/mol.

34. The extrudable thermoplastic composition of claim 19, wherein the at least one polyethylene glycol is a first polyethylene glycol having a weight average molecular weight, $M_w$ of from 2,000 to 10,000 g/mol, and a second polyethylene glycol having a weight average molecular weight, $M_w$ of from 250,000 to 350,000 g/mol.

35. The extrudable thermoplastic composition of claim 19, wherein the thermoplastic composition comprises from 200 to 2,000 parts per million of the at least one polyethylene glycol based on the weight the linear polyethylene.

36. A process for preparing a thermoplastic composition extrudate, the process comprising:
   a) preparing a thermoplastic composition by combining a linear polyethylene with i) 200 to 4,000 parts per million of at least one polyethylene glycol, based on the weight of the linear polyethylene and ii) from 3.0 weight percent to 15.0 weight percent of a high pressure low density polyethylene (LDPE) based on the total weight of the linear polyethylene and the high pressure LDPE; and
   b) extruding the thermoplastic composition in a melt extrusion process;
   wherein the linear polyethylene is selected from the group consisting of linear low density polyethylene (LLDPE), medium density polyethylene (MDPE), very low density polyethylene (VLDPE), high density polyethylene (HDPE), and mixtures thereof;
   wherein the thermoplastic composition is substantially free of fluoropolymers; and wherein the melt extrusion process is carried out in the absence of fluoropolymers.

37. The process of claim 36, wherein the linear polyethylene comprises zinc oxide.

38. The process of claim 36, wherein the linear polyethylene comprises hydrotalcite.

* * * * *